United States Patent
Ganesan et al.

(10) Patent No.: US 8,231,925 B2
(45) Date of Patent: *Jul. 31, 2012

(54) INGREDIENT SYSTEMS COMPRISING TREHALOSE, FOOD PRODUCTS CONTAINING TREHALOSE, AND METHODS OF MAKING SAME

(75) Inventors: Krishnamurthy Ganesan, Arlington Heights, IL (US); Hans Zoerb, River Falls, WI (US); Gerry Mullally, West Port, CT (US); Dwight Weigle, Eden Prairie, MN (US); Timm Adams, Eden Prairie, MN (US)

(73) Assignee: Cargill, Incorporated, Wayzata, MN (US)

( * ) Notice: Subject to any disclaimer, the term of this patent is extended or adjusted under 35 U.S.C. 154(b) by 416 days.

This patent is subject to a terminal disclaimer.

(21) Appl. No.: 11/670,920

(22) Filed: Feb. 2, 2007

(65) Prior Publication Data

US 2007/0292593 A1    Dec. 20, 2007

Related U.S. Application Data

(63) Continuation-in-part of application No. 11/207,550, filed on Aug. 19, 2005.

(60) Provisional application No. 60/602,878, filed on Aug. 20, 2004.

(51) Int. Cl.
A23L 1/22 (2006.01)
(52) U.S. Cl. .......... 426/649; 426/74; 426/582; 426/637; 426/806; 426/808
(58) Field of Classification Search .................. 426/649, 426/74, 615, 641, 582, 658, 589, 72, 73, 426/648
See application file for complete search history.

(56) References Cited

U.S. PATENT DOCUMENTS

| | | | |
|---|---|---|---|
| 2,742,366 A | 4/1956 | Power | |
| 3,934,047 A | 1/1976 | Schade | |
| 4,001,455 A | 1/1977 | La Via et al. | |
| 4,521,252 A | 6/1985 | Miyake et al. | |
| 4,560,574 A | 12/1985 | Meyer | |
| 4,762,857 A | 8/1988 | Bollin, Jr. et al. | |
| 4,839,164 A | 6/1989 | Smith | |
| 4,988,532 A | 1/1991 | Buckholz, Jr. et al. | |
| 4,994,490 A | 2/1991 | Roy et al. | |
| 5,026,566 A | 6/1991 | Roser | |
| 5,232,735 A | 8/1993 | Kurtz et al. | |
| 5,455,168 A | 10/1995 | Maruta et al. | |
| 5,472,863 A | 12/1995 | Maruta et al. | |
| 5,543,513 A | 8/1996 | Mandai et al. | |
| 5,631,038 A | 5/1997 | Kurtz et al. | |
| 5,643,941 A | 7/1997 | Kurtz et al. | |
| 5,693,788 A | 12/1997 | Barron et al. | |
| 5,723,327 A | 3/1998 | Ikegami et al. | |
| 5,892,026 A | 4/1999 | Okada et al. | |
| 5,919,668 A | 7/1999 | Mandai et al. | |
| 5,922,580 A | 7/1999 | Maruta et al. | |
| 5,989,610 A | 11/1999 | Ruzek | |
| 6,005,100 A | 12/1999 | Mandai et al. | |
| 6,017,899 A | 1/2000 | Maruta et al. | |
| 6,090,792 A | 7/2000 | Nishimoto et al. | |
| 6,159,529 A * | 12/2000 | Uchida et al. ................. | 426/649 |
| 6,248,379 B1 | 6/2001 | Capodieci et al. | |
| 6,432,470 B2 | 8/2002 | Chaen et al. | |
| 6,455,511 B1 | 9/2002 | Kampinga et al. | |
| 6,641,853 B1 | 11/2003 | Kowata et al. | |
| 6,991,820 B2 | 1/2006 | Ming et al. | |
| 2002/0006466 A1 | 1/2002 | Chaen et al. | |
| 2003/0118704 A1 | 6/2003 | De Vegt et al. | |
| 2004/0047958 A1 | 3/2004 | Kowata et al. | |
| 2004/0047962 A1 | 3/2004 | Takaichi et al. | |
| 2004/0209841 A1 | 10/2004 | Oku et al. | |
| 2004/0219283 A1 | 11/2004 | Evans | |
| 2005/0153015 A1 | 7/2005 | Inoue et al. | |
| 2005/0249846 A1 | 11/2005 | Evans et al. | |
| 2006/0088649 A1 | 4/2006 | Ganesan et al. | |
| 2006/0096587 A1 | 5/2006 | Brouns et al. | |
| 2006/0172059 A1 | 8/2006 | Takeuchi et al. | |
| 2006/0177553 A1 | 8/2006 | Kubota et al. | |
| 2008/0107789 A1 | 5/2008 | Akimoto et al. | |

FOREIGN PATENT DOCUMENTS

| | | |
|---|---|---|
| CN | 1452887 | 11/2003 |
| CN | 1482863 | 3/2004 |
| CN | 1698442 | 11/2005 |
| CN | 1899053 | 1/2007 |
| CN | 1994131 | 7/2007 |
| EP | 0297887 A1 | 1/1989 |
| EP | 0606753 A2 | 7/1994 |
| EP | 0636693 A2 | 2/1995 |
| EP | 0688866 A1 | 12/1995 |
| EP | 0690131 A1 | 1/1996 |
| EP | 0691407 A1 | 1/1996 |
| EP | 0739986 A1 | 10/1996 |
| EP | 0813820 A1 | 12/1997 |

(Continued)

OTHER PUBLICATIONS

Whetstine et al., Characterization of Dried Whey Protein Concentrate and Isolate Flavor, *J. Dairy Sci.*, 88:3826-3839 (2005).
Kawai et al., "Changes in blood glucose and insulin after an oral palatinose administration in normal subjects," *Endocrinologia Japonica*, 32(6):933-936 (1985). (Abstract Only).
Examination Report from EPC Application No. 04 754 425.9 (May 4, 2006).
International Preliminary Report on Patentability from PCT/US2005/029697 (2007).
"Ingredients—Trehalose," *Science Toys.com* (http://sci-toys.com/ingredients/trehalose.html).
"Soy Peptide Hinute," Fuji Oil Co., LTD.
First Official Report, dated Apr. 19, 2010, from the Australian Patent Office for corresponding Australian Patent Application No. 2005277172, filed Aug. 19, 2005, 3 pp.

(Continued)

Primary Examiner — Helen F Heggestad

(57) ABSTRACT

Methods for reducing the sodium content of finished food products comprising adding trehalose to suitable food products in an amount ranging from greater than 0% to less than 1.5% by weight of the finished food product and by optionally further adding sodium and or potassium. Ingredient systems for achieving salt (i.e. sodium) reduction in suitable food products are also provided. The ingredient systems comprise trehalose and can include sodium, potassium, or combinations thereof.

14 Claims, No Drawings

FOREIGN PATENT DOCUMENTS

| | | | |
|---|---|---|---|
| EP | 0882408 A1 | 12/1998 |
| EP | 0951839 A2 | 10/1999 |
| EP | 0983727 A2 | 3/2000 |
| EP | 1008307 A1 | 6/2000 |
| EP | 1426380 A1 | 6/2004 |
| EP | 1481590 A1 | 12/2004 |
| EP | 1582105 | 10/2005 |
| EP | 1614356 A1 | 1/2006 |
| GB | 2353934 A | 3/2001 |
| GB | 2356788 A | 6/2001 |
| JP | 62-257346 | 11/1987 |
| JP | 63-112963 | 5/1988 |
| JP | 07-079745 | 3/1995 |
| JP | 07-227243 | 8/1995 |
| JP | 07-255378 | 10/1995 |
| JP | 07-308150 | 11/1995 |
| JP | 07-323084 | 12/1995 |
| JP | 08-009931 | 1/1996 |
| JP | 09-056342 | 3/1997 |
| JP | 09-094055 | 4/1997 |
| JP | 09-173017 | 7/1997 |
| JP | 10-014536 | 1/1998 |
| JP | 10/225273 | 8/1998 |
| JP | 10-066540 | 10/1998 |
| JP | 2000-262216 | 9/2000 |
| JP | 2001-029043 | 2/2001 |
| JP | 2001-069941 | 3/2001 |
| JP | 2001-190248 | 7/2001 |
| JP | 2002-209547 A | 7/2002 |
| JP | 2002-325554 A | 11/2002 |
| JP | 325554 A * | 11/2002 |
| JP | 2003-189821 | 7/2003 |
| WO | WO 92/03565 | 3/1992 |
| WO | WO 92/07947 | 5/1992 |
| WO | WO 96/08979 A1 | 3/1996 |
| WO | WO 03/022288 | 3/2003 |
| WO | WO 2004/082576 A2 | 9/2004 |
| WO | WO 2004/082576 A3 | 9/2004 |
| WO | WO 2004/084655 A1 | 10/2004 |
| WO | WO 2004/098321 A1 | 11/2004 |
| WO | WO 2004/107883 A1 | 12/2004 |
| WO | WO 2005/013720 A2 | 2/2005 |
| WO | WO 2005/013720 A3 | 2/2005 |
| WO | WO 2005/014839 A2 | 2/2005 |
| WO | WO 2005/016022 A1 | 2/2005 |
| WO | WO 2005/016031 A1 | 2/2005 |
| WO | WO 2005/020721 A1 | 3/2005 |
| WO | WO 2005/059152 A1 | 6/2005 |
| WO | WO 2005/079516 A2 | 9/2005 |
| WO | WO 2005/079516 A3 | 9/2005 |
| WO | WO 2006/023812 A1 | 3/2006 |
| WO | WO 2006/101706 A1 | 9/2006 |

OTHER PUBLICATIONS

Final Office Action issued Apr. 30, 2010, from the U.S. Patent and Trademark Office for corresponding U.S. Appl. No. 11/207,550, 10 pp.

Notice of Reasons for Rejection from the Japanese Patent Office for corresponding Japanese Patent Application No. 2007-528072, Japanese language document and English translation document, 8 pp total.

Hellemann, "Perceived Taste of NaC1 and Acid Mixtures in Water and Bread," *International Journal of Food Science & Technology*, 27(2):201-211, (1992) Abstract Only.

"Sensory Results," Cargill, Inc., 8 pages, Mar. 27, 2012.

"Reduced Sodium Baked Beans," Cargill, Inc., 9 pages, Mar. 27, 2012.

"Sensory Results of Crackers," Cargill, Inc., 6 pages, Mar. 27, 2012.

"Competitive Assessment," Cargill, Inc., 9 pages, Mar. 27, 2012.

"Sensory Analysis Report," Cargill, Inc., 7 pages, Mar. 27, 2012.

Declaration by Janice Johnson, Ph.D. Pursuant to 37 C.F.R. § 1.132, Feb. 3, 2012, 2 pages.

* cited by examiner

INGREDIENT SYSTEMS COMPRISING TREHALOSE, FOOD PRODUCTS CONTAINING TREHALOSE, AND METHODS OF MAKING SAME

RELATED APPLICATIONS

This application is a continuation-in-part of U.S. application Ser. No. 11/207,550 filed Aug. 19, 2005, which in turn claims priority under 35 U.S.C. §119(c) of U.S. Application No. 60/602,878, filed Aug. 20, 2004.

FIELD OF INVENTION

The present invention relates to salt-substitute compositions comprising trehalose, food products comprising such compositions and methods of preparing such food products. The salt-substitute compositions include ingredient systems comprising trehalose, potassium chloride, and/or sodium chloride, and the food products comprising the ingredient system include less than 1.5% trehalose by weight. The present invention also relates to ingredient systems comprising trehalose, which systems can be useful for reducing the level of sodium in food products; food products comprising less than 1.5% by weight of trehalose, which food products can have a reduced level of sodium; and methods of reducing the amount of sodium in food products. As used herein, "trehalose" refers to alpha-D-glucopyranosyl alpha-D-glucopyranoside in a form that is suitable for human consumption.

BACKGROUND

Salt substitute compositions containing potassium chloride with and without sodium chloride have been proposed for people who seek to reduce the amount of sodium chloride in their diet due to medical necessity or for other reasons. However, potassium chloride can be associated with a bitter, metallic taste and salt-substitute compositions comprising potassium chloride can therefore lack palatability and/or lack satisfactory similarity to common salt (i.e. sodium chloride) in taste.

U.S. Pat. No. 6,159,529 ("the '529 patent") relates to a method for enhancing the salty-taste and/or delicious-taste of food products containing sodium chloride by incorporating trehalose into the food product in the range of 1.5% to 12% on a dry solid basis. The '529 patent states that trehalose content below 1.5% does not sufficiently enhance the level of salty- and delicious-taste.

SUMMARY

The present invention relates to methods for reducing the sodium content of finished food products by adding trehalose to suitable food products in an amount ranging from greater than 0% to less than 1.5% by weight of the finished food product. The method can further include adding potassium or sodium or combinations thereof to the suitable food products. In some embodiments, the finished food product has less sodium than a control product, yet the finished food product has a similar salty taste and flavor as the control product. The present invention also relates to ingredient systems for achieving salt (i.e. sodium) reduction in suitable food products. The ingredient systems comprise trehalose and can include sodium, potassium, or combinations thereof.

For purposes of this specification, "suitable food products" specifically refer to liquid systems, including food systems that have a liquid component including salt, food systems having topically applied salt, and cheese spreads. Examples of suitable finished food systems include marinated meats such as marinated whole muscle meat (e.g. beef, pork, poultry); Soups, Sauces, Stews; Bullion, Pasta and Sauce; Prepared Instant Pasta; Prepared Instant Rice; Prepared Meat seasoning Mixes; Gravy; Marinades; Glazes; Vegetable Side dishes; Potato Side Dishes; Dressings; Salsa; Meat and Vegetable Stocks; Soy Sauce (wherein the culture is not capable of metabolizing trehalose); Meat and Vegetables Base; Potato Chips; Crackers; Pretzels; Tortilla Chips; French Fries; Popcorn; Extruded Snacks; Rice Cakes; Baked Goods with topically applied salt; topically applied seasonings, including: Seasoned Snacks (Potato chips, Corn Chips, Tortilla chips, Rice Cakes, Cheese Puffs); Seasoned Potatoes; Potato Sticks; Soy Crisps; Meat Rubs; cheese spreads including: process cheese base products (e.g. spreads, sauces; slices); dips (e.g. bean, dairy); cream cheese; cottage cheese; vegetables including: pickles; canned vegetables; canned tomato products (e.g. whole, paste, sauce); salsa; plain and prepared beans (e.g. legumes); sauerkraut, and, beverages including: vegetable juices and cocktails, and isotonic beverages. The salt reduction method may be used with any available application of the food products such as fresh, shelf stable, frozen and refrigerated applications.

A "control food product" (or "full salt" food product) is a food product has substantially similar ingredients to a reduced sodium finished food product, except that the control food product includes a greater amount of sodium than the reduced sodium finished food product, and the control product does not include trehalose. Stated another way, a "control" food product (or "full salt" food product) is substantially similar to a reduced sodium food product except that the control food product contains a target amount of salt and the "reduced sodium" food product comprises trehalose, and at least one of potassium chloride and salt in place of the target amount of salt. Preferably, the reduced sodium food product contains a combination of trehalose, salt, and potassium chloride in place of the target amount of salt.

DESCRIPTION

In one embodiment, the method of making a suitable finished food product comprises: (i) adding a total amount of sodium and potassium to a food product, wherein the total amount equals an amount of sodium added to a control food product; and, (ii) adding an amount of trehalose ranging from greater than 0% to less than 1.5% by weight of the finished food product to the food product.

In one embodiment, the method of making a suitable finished food product comprises: (i) adding a total amount of sodium and potassium to a food product, wherein the total amount equals an amount of sodium added to a control food product, and further wherein the total amount of the sodium and potassium comprises from about 20% to about 50% potassium by weight; and, (ii) adding an amount of trehalose ranging from greater than 0% to less than 1.5% by weight of the finished food product to the food product, wherein the finished food product and the control product have a comparable salty taste.

In one embodiment, the method of making a suitable finished food product comprises (i) adding a total amount of sodium and potassium to a food product, wherein the total amount equals an amount of sodium added to a control food product, and further wherein the total amount of the sodium and potassium comprises from about 20% to about 50% potassium by weight; and, (ii) adding an amount of trehalose ranging from greater than 0% to less than 1.5% by weight of the finished food product to the food product, wherein the finished food product and the control product have both a comparable salty taste and flavor.

In one embodiment, the method comprises: adding a total amount of sodium, potassium, and trehalose to a suitable food product, wherein the total amount equals an amount of sodium added to a control food product, and wherein the amount of trehalose added is less than 1.5% by weight of the food product to the food product.

In one embodiment, the method comprises making a finished food product, wherein making the finished food product comprises adding a total amount of sodium and trehalose to a suitable food product, wherein the finished food product has the same salty taste as a control product and further wherein the finished food product contains less than 1.5% trehalose by weight and less total sodium than the control product. In one embodiment, the method comprises making a finished food product, wherein making the finished food product comprises adding a total amount of potassium and trehalose to a suitable food product, wherein the finished food product has the same salty taste as a control product and further wherein the finished food product contains less than 1.5% trehalose by weight and less total sodium than the control product. In one embodiment, the method comprises making a finished food product, wherein making the finished food product comprises adding a total amount of sodium, potassium and trehalose to a suitable food product, wherein the finished food product has the same salty taste as a control product and further wherein the finished food product contains less than 1.5% trehalose by weight and less total sodium than the control product.

The present invention also relates to ingredient systems useful for salt-substitute compositions. In one embodiment, the ingredient systems comprise sodium, potassium, and trehalose, wherein the ingredient systems when added to a suitable food product produces a finished food product having less than 1.5% trehalose by weight. In one embodiment, the ingredient systems comprise sodium chloride, potassium chloride, and trehalose, wherein the ingredient systems, when added to a suitable food product, deliver less than 1.5% trehalose by weight. In one embodiment, the ingredient systems comprise sodium, potassium, and trehalose, wherein the ingredient systems when added to a suitable food product produces a finished food product including less than 1.5% trehalose by weight, and wherein the finished food product contains an amount of sodium and potassium equal to the amount of sodium in a control food product. In one embodiment, the ingredient systems comprise sodium, potassium, and trehalose, wherein the ingredient systems when added to a suitable food product produces a finished food product including less than 1.5% trehalose by weight, and wherein the finished food product contains from about 20% to about 50% less sodium than a control food product, and further wherein the finished food product and the control food product have a comparable salty taste and comparable flavor.

In some embodiments according to the present invention, the salt-substitute compositions comprise trehalose and sodium (for example sodium chloride). In some embodiments according to the present invention, the compositions comprise trehalose and potassium (for example potassium chloride). In some embodiments according to the present invention, the compositions comprise trehalose, sodium (for example sodium chloride) and potassium (for example potassium chloride). In some embodiments according to the present invention, the salt substitute compositions are used as seasonings for finished food products, and/or incorporated into finished food products. In some embodiments where the salt-substitute compositions are used as seasonings and/or incorporated into finished food products, the amount of trehalose in the finished food product is less than 1.5% by weight of the finished food product. In such embodiments, the amount of trehalose in the salt-substitute composition may, however, be far greater than 1.5% by weight of the salt-substitute composition. For example, the amount of trehalose in the salt-substitute composition may be determined by the following formula: $1.49=S/(100-T)*T$, explained in more detail below. In some embodiments, the amount of trehalose in the finished food product is less than 1.5% by weight of the finished food product and is such that the sweet taste of trehalose is imperceptible. It should be noted that the term "blend", when used to describe combinations of trehalose and other salts, is used interchangeably with the phrase "salt substitute composition comprising trehalose." Specifically, the term "blend" is not intended to mean, nor does it mean that the composition is or has been mixed, or that the composition is homogenous.

According to one embodiment of the present invention, a composition comprises:
(i) sodium chloride; and
(ii) trehalose at an amount of less than 1.5% by weight of the composition.

In some embodiments, the amount of trehalose may be up to about 1.2%, up to about 1.0%, up to about 0.75%, up to about 0.5%, up to 0.10%, up to about 0.075%; up to about 0.05%, up to about 0.0225%, up to about 0.015%; up to about 0.01%, up to about 0.008%, up to about 0.005%, up to about 0.003%, or up to 0.001% by weight of the composition. In other embodiments, the amount of trehalose may be about 0.001% to about 1.4%; about 0.003% to about 0.5%; about 0.003% to about 0.1%; about 0.003% to about 0.075%; about 0.003% to about 0.05%; about 0.003% to about 0.0225%; about 0.003% to about 0.015%; about 0.003% to about 0.008%; about 0.015% to about 0.1%; about 0.015% to about 0.075%; about 0.015% to about 0.05%; or about 0.015% to about 0.0225% by weight of the composition.

Another embodiment according to the present invention relates to a food product comprising sodium chloride and trehalose, wherein the amount of trehalose is less than 1.5% by weight of the food product. In some embodiments, the amount of trehalose in the blend is up to 99%, up to about 95%, up to about 90%, up to about 85%, up to about 80%, up to about 75%, up to about 70%, up to about 65%, up to about 60%, up to about 55%, up to about 50%, up to about 45%, up to about 40%, up to about 35%, up to about 30%, up to about 25%, up to about 20%, up to abut 15%, up to about 10%, up to about 5% by weight of the blend. In some embodiments the amount of sodium in the food product is from about 20% to about 50% less than the amount of sodium in a control food product and the food product and control food product have similar salt taste and similar flavor.

A further aspect of the present invention relates to a composition comprising:
(i) a blend of sodium chloride and potassium chloride; and
(ii) trehalose at an amount of less than 1.5% by weight of the composition.

In one embodiment, the blend comprises up to about 99.9% by weight potassium chloride. In other embodiments, the blend comprises up to about 95%, up to about 90%, up to about 85%, up to about 80%, up to about 75%, up to about 70%, up to about 65%, up to about 60%, up to about 55%, up to about 50%, up to about 45%, up to about 40%, up to about 35%, up to about 30%, up to about 25%, up to about 20%, up to about 15%, up to about 10%, or up to about 5% by weight potassium chloride.

In another embodiment, the blend comprises about 50% by weight sodium chloride and about 50% by weight potassium chloride. In an example of this embodiment, the amount of trehalose is about 0.20% by weight of the composition.

In a further embodiment, the blend comprises 5% by weight sodium chloride and 95% by weight potassium chloride. In an example of this embodiment, the amount of trehalose is about 0.95% by weight of the composition.

Another aspect of the present invention relates to a composition comprising:
(i) sodium chloride;
(ii) potassium chloride; and
(iii) trehalose at a sufficient amount to obtain a composition having less bitterness and/or metallic flavor than a control composition that does not contain trehalose.
In one embodiment, the bitterness and/or metallic flavor is attributed to potassium chloride. "Flavor" refers to a taste sensation or a blend of taste and smell sensations evoked by a substance in the mouth.

Another aspect of the present invention relates to a food product comprising:
(i) one or more food ingredient(s); and
(ii) a blend of trehalose and sodium chloride and potassium chloride, wherein the blend provides an amount of trehalose that is less than 1.5% by weight of the food product. The amount of trehalose in the blend may vary depending upon the amount of the blend in the food product. In one embodiment, the amount of trehalose in the blend is calculated by the formula:

$$[S+1.49]*T=149,$$

wherein S refers to the amount of sodium chloride generally found in the food product, as a percent by weight of the food product, and T refers to the percent by weight of the trehalose in the salt substitute used in place of the sodium chloride, or "S".

Non-limiting examples of this embodiment include those set forth in Table I below:

TABLE I

| % Salt in Finished Product Salt (w/w) | % Trehalose in Blend (w/w) (blend does not contain processing aid) | % Trehalose in Blend (w/w) (blend contains 1% w/w/processing aid, e.g. anticaking agent) |
|---|---|---|
| 0.5 | 74.9 | 74.15 |
| 1.0 | 59.9 | 59.301 |
| 1.5 | 49.9 | 49.401 |
| 2.0 | 42.8 | 42.372 |
| 3.0 | 32.9 | 32.571 |
| 4.0 | 27.1 | 26.829 |
| 5.0 | 23.0 | 22.77 |
| 10 | 13.0 | 12.87 |
| 20 | 6.9 | 6.831 |
| 30 | 4.7 | 4.653 |
| 50 | 2.9 | 2.871 |
| 80 | 1.8 | 1.782 |
| 90 | 1.6 | 1.584 |
| 99 | 1.4 | 1.386 |

According to one embodiment, if a finished food product typically included 1% sodium chloride (i.e. the food product is 1% sodium chloride, 99% other food ingredients), that 1% sodium chloride could be replaced by 1% by weight of a blend, which blend includes 59.9% trehalose and 40.1% of a combination of sodium chloride and potassium chloride. According to another embodiment, if a finished food product typically included 1% sodium chloride, that 1% sodium chloride could be replaced by trehalose and 1% by weight of a blend comprising sodium chloride and potassium chloride (i.e. the original 1% sodium chloride would be replace by more than 1% of a composition comprising trehalose, sodium chloride, and potassium chloride).

In another embodiment, the present invention relates to a food composition, comprising: a blend of trehalose and sodium chloride, wherein the food composition includes less than 1.5% trehalose by weight of the food product. The amount of trehalose in the blend can be far greater than 1.5% (w/w) of the blend, for example up to 99% (w/w) of the blend so long as the amount of trehalose in the food product is less than 1.5% by weight of the food product.

In another embodiment, the present invention relates to a food composition, comprising: a blend of trehalose and potassium chloride, wherein the food composition includes less than 1.5% trehalose by weight of the food product. The amount of trehalose in the blend can be far greater than 1.5% (w/w) of the blend, for example up to 99% (w/w) of the blend so long as the amount of trehalose in the food product is less than 1.5% by weight of the food product.

Non-limiting examples of food products include snacks, bouillons, soups, soup mixes, broths, sauces, sauce mixes, dressings, condiments, mayonnaise, ketchup, meats, juices, pickles, and baked products.

Another aspect of the present invention relates to a food product comprising:
(i) one or more food ingredient(s);
(ii) sodium chloride; and
(iii) trehalose in an amount sufficient to potentiate the salty flavor contributed by the sodium chloride to the food product without affecting the food product's sweetness, wherein the salty flavor is comparable to that of a control food, the control food product contains more sodium chloride than the food product, and the control food product does not contain trehalose. Except for the noted differences, a "control food product" is otherwise substantially the same as the food product.

As an example, the food product may have at least about 50%, at least about 45%, at least about 40%, at least about 35%, at least about 30%, at least about 25%, at least about 20%, at least about 15%, at least about 10%, or at least about 10% less sodium chloride than the control product.

As another example, the food product is very low sodium, low sodium, light in sodium, lightly salted, or les sodium. "Very low sodium" means 35 mg or less per serving or, if the serving is 30 grams or less or 2 tablespoons or less, 35 mg or less per 50 g of the food product. "Low sodium" means 140 mg or less per serving or, if the serving is 30 g or less or 2 tablespoons or less, 140 mg or less per 50 g of the food product. "Light in sodium" means at least 50 percent less sodium per serving than average reference amount for same food product with no sodium reduction. "Lightly salted" means at least 50 percent less sodium per serving than reference amount. "Less sodium" means at least 25 percent less per serving than reference food. See Publication No. FDA 95-2284.

In further embodiments, the food product comprises no more than about 500 mg, no more than about 450 mg, no more than about 400 mg, no more than about 350 mg, no more than about 300 mg, no more than about 250 mg, no more than about 200 mg, no more than about 140 mg, no more than about 100 mg, no more than about 50 mg, or no more than about 35 mg of sodium chloride.

Another aspect of the present invention relates to a food product comprising:
(i) one or more food ingredient(s);
(ii) sodium chloride; and (iii) trehalose at a sufficient amount to obtain a food product having more savory flavor than a control product that does not contain trehalose.

Non-limiting examples of savory flavors include spicy flavor, vegetable flavor, tomato flavor, dill flavor, meat flavor, poultry flavor, chicken flavor and reaction flavors that are added or generated during heating of the food product.

In one embodiment, the amount of trehalose does not affect the food product's sweetness.

Another aspect of the present invention relates to a food product comprising:
(i) one or more food ingredient(s);
(ii) sodium chloride;
(iii) potassium chloride; and
(iv) trehalose at a sufficient amount to obtain a food product having more savory flavor than a control product that does not contain trehalose. In one embodiment, the amount of trehalose does not affect the food product's sweetness.

Another aspect of the present invention relates to a food product comprising:
(i) one or more food ingredient(s);
(ii) sodium chloride;
(iii) potassium chloride; and
(iv) trehalose at a sufficient amount to obtain a food product having less bitterness and/or metallic flavor than a control product that does not contain trehalose.

Another aspect of the present invention relates to a method of preparing a food product, which comprises adding to one or more food ingredient(s), sodium chloride and trehalose at an amount of less than 1.5% by weight of the food product. In one embodiment, the method further comprises adding potassium chloride to the one or more food ingredient(s).

Another aspect of the present invention relates to a method of preparing a food product, which comprises adding to one or more food ingredient(s), sodium chloride and trehalose at a sufficient amount to obtain a food product having more savory flavor than a control product that does not contain trehalose. In one embodiment, the amount of trehalose does not affect the food product's sweetness.

Another aspect of the present invention relates to a method of preparing a food product, which comprises adding to one or more food ingredient(s), sodium chloride and trehalose at a sufficient amount to impart a salty flavor to the food product without affecting the food product's sweetness, wherein the salty flavor is comparable to that of a control food, the control food product contains more sodium chloride than the food product, and the control food product does not contain trehalose. In one embodiment, the method further comprises adding potassium chloride to the one or more food ingredient(s).

Another aspect of the present invention relates to a method of preparing a food product, which comprises combining one or more food ingredient(s), sodium chloride, potassium chloride and trehalose at a sufficient amount to obtain a food product having less bitterness and/or metallic flavor than a control product that does not contain trehalose, without affecting the food product's sweetness.

Another aspect of the present invention relates to a method of preparing a seasoning composition, which comprises combining sodium chloride with trehalose at a sufficient amount to obtain a food product having more savory flavor than a control product that does not contain trehalose. In one embodiment, the amount of trehalose does not affect the food product's sweetness.

Another aspect of the present invention relates to a method of preparing a seasoning composition, which comprises combining sodium chloride with trehalose at a sufficient to impart a salty flavor to the food product without affecting the food product's sweetness, wherein the salty flavor is comparable to that of a control food, the control food product contains more sodium chloride than the food product, and the control food product does not contain trehalose.

Another aspect of the present invention relates to a method of preparing a seasoning composition, which comprises combining sodium chloride, potassium chloride and trehalose at a sufficient amount to obtain a seasoning composition that has less bitterness and/or metallic flavor than a control composition that does not contain trehalose. In one embodiment, the bitterness and/or metallic flavor is attributed to the potassium chloride. In some embodiments (such as for example those illustrated by Examples 2C, 2G, 3 (33% reduction), 4 and 5), the invention provides a salt replacement system enabling reduction of sodium in food products, wherein the salt replacement system comprises salt (i.e. sodium chloride) in an amount "X", potassium chloride in an amount "Y", and trehalose in an amount "Z", wherein if "A" equals the total amount of salt in a control food product and "B" equals the desired amount of salt reduction for the reduced sodium food product (stated otherwise "B" is the difference between the amount of salt in the control food product and the amount of salt in the reduced sodium food product), then X is approximately A-B, Y ranges from about B to about 1.6B, and Z ranges from about 0.8Y to about 1.2Y.

In some embodiments, the invention provides a salt replacement system enabling reduction of sodium in food products, wherein the salt replacement system comprises at least one of trehalose in an amount ranging from 0 to Z, potassium chloride in an amount ranging from 0 to Y, and salt in an amount ranging from 0 to X, where Z is the total amount of trehalose in the ultimate food product, Y is the total amount of potassium chloride in the ultimate food product, and X is the total amount of salt in the ultimate food product, and the relationship between X, Y, and Z is as described in the preceding paragraph. Specifically, if "A" equals the total amount of salt in a control food product (a full salt product) and "B" equals the desired amount of salt reduction (stated otherwise "B" is the difference between the amount of salt in the control food product and the amount of salt in the reduced sodium food product), then X is approximately A-B, Y ranges from about B to about 1.6B, and Z ranges from about 0.8Y to about 1.2Y.

In some embodiments, the invention provides reduced sodium food products comprising salt (i.e. sodium chloride) in an amount "X", potassium chloride in an amount "Y", and trehalose in an amount "Z", wherein if "A" equals the total amount of salt in a control food product and "B" equals the desired amount of salt reduction for the reduced sodium food product, then X is approximately A-B, Y ranges from about B to about 1.6B, and Z ranges from about 0.8Y to about 1.2Y. Non-limiting examples of food products that may comprise the salt replacement system include potato chips, chicken broth, chicken gravy, marinated chicken breast, salsa, spaghetti sauce, Alfredo sauce, beef jerky, cheese spread, chili, chicken noodle soup, baked beans, salad dressing, BBQ sauce, battered and breaded formed chicken, breakfast sausage, Italians sausage, ranch dressing, French fries, brown sugar oatmeal, and cooked turkey loaf. In some embodiments, the reduced sodium food products according to the invention contain about 20% to about 50% less sodium as compared to a full salt control food product. In some embodiments, the reduced sodium food products according to the invention contain about 25% to about 50% less sodium as compared to a full salt control food product. In some embodiments, the reduced sodium food products according to the invention contain about 25% to about 33⅓% less sodium as compared to a full salt control food product.

In some embodiments, the invention provides methods of making a salt replacement system enabling reduction of sodium in food products, comprising combining salt in an amount "X" with potassium chloride in an amount "Y" with trehalose in amount Z, wherein Z ranges from 0.8Y to 1.2Y and Y ranges from (X)(P)/(100−P) to 1.6(X)(P)/(100−P), where P is the desired percent reduction in salt versus the full salt control. Thus, for example, if the desired percent reduction in salt is 40 and the amount of salt in the salt replacement system is 15 g (therefore the amount of salt in the full salt control would be 25 g), then the amount of potassium chloride could range from about 10 g to about 16 g. If the amount of potassium chloride was chosen to be 12 g, then the amount of trehalose could range from about 9.6 g to about 14.4 g.

In some embodiments, the invention provides methods of making a salt replacement system enabling reduction of sodium in food products, comprising combining salt in an amount ranging from 0 to "X" with potassium chloride in an amount ranging from 0 to "Y" with trehalose in amount ranging from 0 to Z, wherein Z can be any amount chosen from 0.8Y to 1.2Y and Y can be any amount chosen from (X)(P)/(100−P) to 1.6(X)(P)/(100−P), and where P is the desired percent reduction in salt versus the fill salt control.

In some embodiments, the invention provides methods of making reduced sodium food products, comprising preparing a food product having a desired percentage sodium reduction by calculating the total amount of sodium in a control food product; preparing a reduced sodium food product with an amount of sodium, which differs from the amount of sodium in the control by a desired percentage, wherein the difference in the amount of sodium is achieved by reducing the amount of salt in the final food product versus the control food product by an amount B, and including an amount of potassium chloride in amount "Y", which ranges from about B to about 1.6B, and further including trehalose in an amount "Z", which ranges from 08.Y to 1.2Y. The total amount of sodium in the control food product can be calculated, for example, by reviewing the control food product's 100% formula and nutritional information to identify all sources of sodium (in addition to salt), and calculating the sodium contribution form each ingredient. A person of ordinary skill should appreciate that a food product comprising a salt replacement system according to the invention may achieve a greater reduction in salt than sodium as compared to the control (i.e. full salt) food product. This is because sodium reduction is calculated based upon all sources of sodium in the control product, including but not limited to salt, but reduction in sodium is achieved by reducing the amount of salt. Example 5, for instance, illustrates a processed cheese spread having 25% reduced sodium content as compared to the full salt control, which reduction was achieved by producing a cheese spread having 40% less salt (NaCl) content than the full salt control.

The above-described salt-substitutes can be applied to a broad range of food products. Similarly, the sodium content of a broad range of food products can be reduced (as compared to the typical sodium content of the food product) while still maintaining desirable saltiness and flavor by making the food products with sodium and trehalose, and optionally potassium. The food products include those identified as "suitable food products" above.

It will be apparent to one of ordinary skill in the art that specific embodiments of the present invention may be directed to one, some or all of the above-indicated aspects as well as other aspects, and may encompass one, some or all of the above- and below-indicated embodiments, as well as other embodiments. Thus, for example, a food product in accordance with the present invention may comprise: i) one or more food ingredients, ii) potassium chloride; and, iii) trehalose in an amount sufficient to mask the bitterness of the potassium chloride, and/or in an amount sufficient to obtain a food product having more savory flavor than a control product that does not contain trehalose, and/or in an amount sufficient to enhance the salty flavor of potassium chloride.

Other than in the working examples, or where otherwise indicated, all numbers expressing quantities of ingredients, reaction conditions, and so forth used in the specification and claims are to be understood as being modified by the term "about". Accordingly, unless indicated to the contrary, such numbers are approximations that may vary depending upon the-desired properties sought to be obtained by the present invention. At the very least, and not as an attempt to limit the application of the doctrine of equivalents to the scope of the claims, each numerical parameter should be construed in light of the number of significant digits and ordinary rounding techniques.

While the numerical ranges and parameters setting forth the broad scope of the invention are approximations, the numerical values set forth in the working examples are reported as precisely as possible. Any numerical value, however, inherently contains certain errors necessarily resulting from the standard deviation found in their respective testing measurements.

EXAMPLES

The following examples are illustrative of the present invention and are not intended to be limitations thereon.

Example 1

Creamy Chicken Soup

Laboratory Method of Preparation

1. Weigh about a third of the water in a stainless steel container.
2. Blend in the water at medium speed (~7500 rpm), the chicken base using a high-speed mixer such as Omni International's PowerGen Homogenizer.
3. Add and blend in Trehalose, potassium chloride and salt mixture at medium speed.
4. Add and blend in all remaining dry ingredients—starches, maltodextrin, onion and garlic powders, beta-carotene and white pepper.
5. Melt the mono- and di-glycerides in the soybean oil and blend. Blend in the oil at high speed (~10,000 rpm).
6. Add remaining water and blend at low speed, ~5000 rpm, to a uniform consistency.
7. Transfer the soup preparation into Mason jars and cook the samples in a pressure cooker at 15 psi for 40 minutes. Follow the recommended method for pressure-cooking. After the samples cooled down, store them in a refrigerator for evaluations.

Example 1A

| Ingredient Composition | Control Percent | Weight (g) | 50% Reduced Sodium Percent | Weight (g) |
|---|---|---|---|---|
| Unsalted Chicken Base (Five Star Foods) | 2.5000 | 25.00 | 2.5000 | 25.00 |
| Modified Food Starch HI-Form 12747 (Cerestar) | 1.8000 | 18.00 | 1.8000 | 18.00 |
| Maltodextrin 18 DE, #01918 (Cerestar) | 1.5000 | 15.00 | 1.5000 | 15.00 |
| Soybean Oil, Salad Oil | 1.0000 | 10.00 | 1.0000 | 10.00 |
| Sodium Chloride | 0.8000 | 8.00 | 0.4000 | 4.00 |
| Potassium Chloride | 0.0000 | 0.00 | 0.4000 | 4.00 |
| Trehalose (Cargill) | 0.0000 | 0.00 | 0.0150 | 0.15 |
| Corn starch | 0.3000 | 3.00 | 0.3000 | 3.00 |
| Mono- and Di-glycerides, Dimodan S (Danisco) | 0.3000 | 3.00 | 0.3000 | 3.00 |
| Onion Powder | 0.2600 | 2.60 | 0.2600 | 2.60 |
| Garlic Powder | 0.1000 | 1.00 | 0.1000 | 1.00 |
| Beta-Carotene 1% Powder, CWS 16,670 I.U/g (Roche Vit.) | 0.0100 | 0.10 | 0.1000 | 0.10 |
| White Pepper | 0.0100 | 0.10 | 0.0100 | 0.10 |
| Water | 91.4200 | 664.20 | 66.4050 | 664.05 |
| Total | 100.0000 | 1000.00 | 100.0000 | 1000.00 |

Example 1B

Creamy Chicken Soup - 50% Sodium Reduction

| Ingredient Composition | Percent | Weight (g) |
|---|---|---|
| Five Star Chicken Base (Unsalted Base) | 4.0000 | 960.00 |
| Modified Food Starch HI-Form 12747 (Cerestar) | 1.8000 | 432.00 |
| Maltodextrin 18 DE, # 01918 (Cerestar) | 1.5000 | 360.00 |
| Soybean Oil, Salad Oil | 1.0000 | 240.00 |
| Sodium Chloride | 0.3250 | 78.00 |
| Potassium Chloride | 0.3250 | 78.00 |
| Trehalose (Cargill) | 0.0100 | 2.40 |
| Corn starch | 0.3000 | 72.00 |
| Mono and Di-glycerides, Dimodan S (Danisco) | 0.3000 | 72.00 |
| Onion Powder | 0.1500 | 36.00 |
| Garlic Powder | 0.0500 | 12.00 |
| Beta-Carotene 1% Powder, CWS 16,670 I.U/g (RochVit.) | 0.0100 | 2.40 |
| White Pepper | 0.0100 | 2.40 |
| Water | 90.2200 | 21652.80 |
| Total | 100.0000 | 24000.00 |

Example 1C

Creamy Chicken Soup - 50% Sodium Reduction

| Ingredient Composition | Percent | Weight (g) |
|---|---|---|
| Five Star Chicken Base (Unsalted Base) | 4.0000 | 960.00 |
| Modified Food Starch HI-Form 12747 (Cerestar) | 1.8000 | 432.00 |
| Maltodextrin 18 DE, # 01918 (Cerestar) | 1.5000 | 360.00 |
| Soybean Oil, Salad Oil | 1.0000 | 240.00 |
| Sodium Chloride | 0.3250 | 78.00 |
| Potassium Chloride | 0.3250 | 78.00 |
| Trehalose (Cargill) | 0.0200 | 4.80 |
| Corn starch | 0.3000 | 72.00 |
| Mono and Di-glycerides, Dimodan S (Danisco) | 0.3000 | 72.00 |
| Onion Powder | 0.1500 | 36.00 |
| Garlic Powder | 0.0500 | 12.00 |
| Beta-Carotene 1% Powder, CWS 16,670 I.U/g (RochVit.) | 0.0100 | 2.40 |
| White Pepper | 0.0100 | 2.40 |
| Water | 90.210 | 21650.40 |
| Total | 100.0000 | 24000.00 |

Example 1D

Creamy Chicken Soup - 50% Sodium Reduction

| Ingredient Composition | Percent | Weight (g) |
|---|---|---|
| Five Star Chicken Base (Unsalted Base) | 4.0000 | 960.0000 |
| Modified Food Starch HI-Form 12747 (Cerestar) | 1.8000 | 432.0000 |
| Maltodextrin 18 DE, # 01918 (Cerestar) | 1.5000 | 360.0000 |
| Soybean Oil, Salad Oil | 1.0000 | 240.0000 |
| Sodium Chloride | 0.3250 | 78.0000 |
| Potassium Chloride | 0.3250 | 78.0000 |
| Trehalose (Cargill) | 0.0271 | 6.5040 |
| Corn starch | 0.3000 | 72.0000 |
| Mono and Di-glycerides, Dimodan S (Danisco) | 0.3000 | 72.0000 |
| Onion Powder | 0.1500 | 36.0000 |
| Garlic Powder | 0.0500 | 12.0000 |
| Beta-Carotene 1% Powder, CWS 16,670 I.U/g (RochVit.) | 0.0100 | 2.4000 |
| White Pepper | 0.0100 | 2.4000 |
| Water | 90.2029 | 21648.6960 |
| Total | 100.0000 | 24000.0000 |

Example 2

Regular Popcorn

Example 2A

Control - Regular Popcorn

| Ingredients | Percent | Weight (g) |
|---|---|---|
| Popcorn Kernels | 65.20 | 41.1 |
| Butter Oil | 32.35 | 20.40 |
| Butter Flavor # 816.32/EN (FONA) | 0.10 | 0.06 |
| Salt (Flour Salt) | 2.35 | 1.48 |
| | 100.00 | 63.06 |

Popcorn Serving Size = 36 grams
Sodium Content = 1.48 g × 23/58.5 × 36/63.06 g × 1000 mg = 332 mg Na/Serving Size

Example 2B

Salt Blends for Sodium Reduction in Regular Popcorns (Use level or equivalent saltiness of salt blends per 100 g of popcorns=1.48 g/0.76=1.95 grams)

| Sodium Reduction | CCompositions of Reduced Sodium Salt Blends | Sodium Content per Serving Size |
|---|---|---|
| A 50% Sodium Reduction | Sodium Chloride 38% = Trehalose 24% = Potassium Chloride 38% = | 1.95 g × 0.38 × 23/58.5 × 36/63.06 × 1000 mg = 166 mg<br>100 − (166/332 × 100) = 50% Sodium Reduction |
| B 33% Sodium Reduction | Sodium Chloride 50.5% = Trehalose 24% = Potassium Chloride 25.5% = | 1.95 × 0.505 × 23/58.5 × 36/63.06 × 1000 mg = 221 mg<br>100 − (221/332 × 100) = 33.4% Sodium Reduction |
| C 25% Sodium Reduction | Sodium Chloride 56.7% = Trehalose 24% = Potassium Chloride 19% = | 1.95 × 0.567 × 23/58.5 × 36/63.06 × 1000 mg = 248.2 mg<br>100 − (248.2/332 × 100) = 25.2% Sodium Reduction |
| D 20% Sodium Reduction | Sodium Chloride 60.5% = Trehalose 24% = Potassium Chloride 15.5% = | 1.95 × 0.605 × 23/58.5 × 36/63.06 × 1000 mg = 264.8 mg<br>100 − (264.8/332 × 100) = 20.2% Sodium Reduction |
| E 15% Sodium Reduction | Sodium Chloride 64.45% = Trehalose 24% = Potassium Chloride 11.55% = | 1.95 × 0.6445 × 23/58.5 × 36/63.06 × 1000 mg = 282.1 mg<br>100 − (282.1/332 × 100) = 15.0% Sodium Reduction |

Example 2C

Compositions of Reduced Sodium Regular Popcorn Formulations

| Ingredients | 50% Sodium Reduction (A) % | 33% Sodium Reduction (B) % | 25% Sodium Reduction (C) % | 20% Sodium Reduction (D) % | 15% Sodium Reduction (E) % |
|---|---|---|---|---|---|
| Popcorn Kernels | 64.45 | 64.45 | 64.45 | 64.45 | 64.45 |
| Butter Oil | 32.35 | 32.35 | 32.35 | 32.35 | 32.35 |
| Butter Flavor # 816.32/EN (FONA) | 0.10 | 0.10 | 0.10 | 0.10 | 0.10 |
| Reduced Sodium Salt Blends | 3.10 | 3.10 | 3.10 | 3.10 | 3.10 |
| Total | 100.00 | 100.00 | 100.00 | 100.00 | 100.00 |

Example 2D

Reduced Sodium Salt Blend Formulations for Light Popcorn

Control - Light Popcorn

| Ingredients | Percent | Weight (g) |
|---|---|---|
| Popcorn Kernels | 85.74 | 60.02 |
| Butter Oil | 11.37 | 7.96 |
| Butter Flavor # 816.32/EN (FONA) | 0.10 | 0.07 |
| Salt (Flour Salt) | 2.79 | 1.95 |
| | 100.00 | 70.00 |

Popcorn Serving Size = 36 grams
Sodium Content = 1.95 g × 23/58.5 × 36/70.0 g × 1000 mg = 394 mg Na/Serving Size

Example 2E

Salt Blends for Sodium Reduction in Light Popcorns
(Use level or equivalent saltiness of salt blends per
100 g of popcorns = 1.95 g/0.76 = 2.57 grams)

| Sodium Reduction | Compositions of Reduced Sodium Salt Blends | Sodium Content per Serving Size |
|---|---|---|
| F 50% Sodium Reduction | Sodium Chloride 38% = Trehalose 24% = Potassium Chloride 38% = | 2.57 g × 0.38 × 23/58.5 × 36/70.0 × 1000 mg ~197 mg 100 − (197/394 × 100) = 50% Sodium Reduction |
| G 33% Sodium Reduction | Sodium Chloride 50.5% = Trehalose 24% = Potassium Chloride 25.5% = | 2.57 × 0.505 × 23/58.5 × 36/70.0 × 1000 mg ~262 mg 100 − (262/394 × 100) = 33% Sodium Reduction |
| H 25% Sodium Reduction | Sodium Chloride 56.7% = Trehalose 24% = Potassium Chloride 19% = | 2.57 × 0.567 × 23/58.5 × 36/70.0 × 1000 mg 248.2 mg 100 − (248.2/394 × 100) = 25.2% Sodium Reduction |
| I 20% Sodium Reduction | Sodium Chloride 60.5% = Trehalose 24% = Potassium Chloride 15.5% = | 2.57 × 0.605 × 23/58.5 × 36/70.0 × 1000 mg 314.4 mg 100 − (314.4/394 × 100) = 20.2% Sodium Reduction |
| J 15% Sodium Reduction | Sodium Chloride 64.45% = Trehalose 24% = Potassium Chloride 11.55% = | 2.57 × 0.6445 × 23/58.5 × 36/70.0 × 1000 mg 334.9 mg 100 − (334.9/394 × 100) = 15.0% Sodium Reduction |

Example 2F

Compositions of Reduced Sodium Light Popcorn Formulations

| Ingredients | 50% Sodium Reduction (F) % | 33% Sodium Reduction (G) % | 25% Sodium Reduction (H) % | 20% Sodium Reduction (I) % | 15% Sodium Reduction (J) % |
|---|---|---|---|---|---|
| Popcorn Kernels | 84.86 | 84.86 | 84.86 | 84.86 | 84.86 |
| Butter Oil | 11.37 | 11.37 | 11.37 | 11.37 | 11.37 |
| Butter Flavor # 816.32/EN (FONA) | 0.10 | 0.10 | 0.10 | 0.10 | 0.10 |
| Reduced Sodium Salt Blends | 3.67 | 3.67 | 3.67 | 3.67 | 3.67 |
| Total | 100.00 | 100.00 | 100.00 | 100.00 | 100.00 |

Example 3

Fried and Baked Potato Chips

Compositions of Reduced Sodium Salt Blends
(Use level or equivalent saltiness of salt blends per
100 g of potato chips = 1.60 g/0.76 = 2.10 grams)

| Sodium Reduction | Percent Potassium Chloride | Percent Trehalose | Percent Sodium Chloride |
|---|---|---|---|
| 75% | 56.6 | 24 | 19.4 |
| 60% | 45 | 24 | 31 |
| 50% | 38 | 24 | 38 |
| 33% | 25.5 | 24 | 50.5 |
| 25% | 15.5 | 24 | 60.5 |
| 20% | 11.55 | 24 | 64.45 |

Lab Preparation of Reduced Sodium Potato Chips
1. Weigh 100 grams of unsalted fried potato chips
2. Weigh the salt (1.60 g) or salt blend (2.10 g) into a salt shaker
3. Transfer the chips into a confectionery type coating vessel lined with a plastic bag.
4. While rotating the vessel at low speed, heat the chips with a heat gun for about 45 seconds or when tiny oil droplet become visible on the chips.
5. Shake the salt or salt blend uniformly on the relatively hot chips while the vessel was rotating.
6. Remove and package the chips in suitable storage bags for evaluations.

Example 4

Sodium Reduction in a Processed Cheese

Processed cheese formulations produced in the lab and evaluated by a group of tasters are shown in Tables below.

TABLE 4.1

Processed Cheddar Cheese Spread Produced with only salt.

| Ingredients | Percent | Weight (g) |
|---|---|---|
| Cheddar Cheese, Medium Cheddar | 39.72 | 317.76 |
| Skim Milk | 28.15 | 225.20 |
| Whey Protein Concentrate, 80% Protein | 1.20 | 9.60 |
| Salt, NaCl | 1.50 | 12.00 |
| Cheddar Cheese Flavor | 0.50 | 4.00 |
| Annatto, Color | 0.08 | 0.64 |
| Carrageenan | 0.70 | 5.60 |
| Low Fat Milk, (1% Fat) | 28.15 | 225.20 |
| Total | 100.00 | 800.00 |

TABLE 4.2

25% Reduced Sodium Processed Cheddar Cheese Spread

| | With Trehalose | | Without Trehalose | |
|---|---|---|---|---|
| Ingredients | Percent | Weight (g) | Percent | Weight (g) |
| Cheddar Cheese, Grated | 39.72 | 317.76 | 39.72 | 317.76 |
| Skim Milk | 28.15 | 225.20 | 28.15 | 225.20 |
| Whey Protein Concentrate, 80% Protein | 1.20 | 9.60 | 1.20 | 9.60 |
| Salt, NaCl | 0.91 | 7.28 | 0.91 | 7.28 |
| Potassium Chloride, KCl | 0.59 | 4.72 | 0.59 | 4.72 |
| Trehalose | 0.59 | 4.72 | 0.00 | 0.00 |
| Cheddar Cheese Flavor | 0.50 | 4.00 | 0.50 | 4.00 |
| Annatto, Color | 0.08 | 0.64 | 0.08 | 0.64 |
| Carrageenan | 0.50 | 4.00 | 0.50 | 4.00 |
| Low Fat Milk, (1% Fat) | 27.76 | 222.08 | 28.35 | 226.80 |
| Total | 100.00 | 800.00 | 100.00 | 800.00 |

Laboratory Process:
1. Weigh the milks into a stainless steel container placed in a water bath. While agitating the milk at medium speed, 8,000 rpm, using a PowerGen Homogenizer, heat the milk to about 120° F.
2. Blend in the warm milk the carrageenan. Continue the heating and the agitation.
3. Increase the mixing speed to 10,000 rpm and blend in the whey protein concentrate and salt. (If Trehalose and KCl are present, blend in the Trehalose followed by KCl before adding and blending in the salt).
4. Add and blend in the Cheddar cheese flavor and then the annatto.
5. Continue the agitation and heat the processed cheese preparation to 185° F. (85° C.).
6. Hold the temperature of the cheese preparation at 185° F. for 5 minutes to Pasteurize the sample.
7. Pour the hot cheese preparation into suitable containers. Cover the cheese spread and store the samples in a refrigerator.

Product Evaluations

The reduced sodium sample in Table 4.2 was evaluated against the control sample shown in Table 4.1. The taste test results are summarized as followed.

The 25% reduced sodium samples were evaluated first by 8 people in the lab and later by 9 panelists at a round table. Both taste panels described the 25% reduced sodium cheese sample with Trehalose as being quite close to the control in saltiness perception and overall flavor. The cheese flavor was described as being balanced when compared to the sample that did not contain Trehalose.

Example 5

Sensory Results for BBQ Potato Chips, Chicken Breast, and Chili

Samples were analyzed in a round table discussion sensory panel. Products were tasted one at a time and discussed prior to tasting the next sample. At the conclusion of tasting each product type the overall conclusions were discussed and agreed upon. Products discussed here are chicken breast, BBQ potato chips and chili.

The Samples were as Follows:
BBQ Potato Chips (three samples)
1. Control
2. 50% reduced sodium (1.6:1, 1:1)
3. 50% reduced sodium (1.6:1, 0:1)
50% Salt Reduction (#2 above):

| | | Control | 50% NaCl Reduction w/o Trehalose | 50% NaCl Reduction | Ranges Tried |
|---|---|---|---|---|---|
| Unsalted Potato Chips | Utz | 91.800% | 92.570% | 91.370% | 91.37%-92.57% |
| Sugar | Domino retail | 1.694% | 1.694% | 1.694% | 1.694% |
| KCl - Reheis K4763 | Reheis | 0.000% | 1.200% | 1.200% | 0-1.2% |
| Trehalose - milled, Test 5 Cargill | Cargill | 1.200% | 0.000% | 1.200% | 0-1.2% |
| Dextrose | Cargill | 0.910% | 0.910% | 0.910% | 0.910% |
| NaCl - Albergers Salt w ShurFlo 52494E | Cargill | 1.540% | 0.770% | 0.770% | 0.77%-1.54% |
| Maltodextrin | Cargill | 0.700% | 0.700% | 0.700% | 0.700% |
| Chili Pepper Dark Red | Atlantic Lot# PEP210180 | 0.700% | 0.700% | 0.700% | 0.700% |
| Molasses Powder | Provesta MRD60 Product Code #30924 | 0.350% | 0.350% | 0.350% | 0.350% |
| Onion Powder | Atlantic Lot# ONN 207980 | 0.280% | 0.280% | 0.280% | 0.280% |
| Mesquite Smoke Flavor | Kraft K2567 Lot #447008870000 | 0.140% | 0.140% | 0.140% | 0.140% |
| Autolyzed Yeast Extract | Provesta 000 Torula Yeast | 0.119% | 0.119% | 0.119% | 0.119% |
| Cumin, grd | Retail | 0.112% | 0.112% | 0.112% | 0.112% |
| Paprika - Spanish 120 ASTA | Atlantic Lot# P10229-01/50 | 0.105% | 0.105% | 0.105% | 0.105% |
| Garlic Powder | Atlantic Lot# P10072-03/500.12 | 0.098% | 0.098% | 0.098% | 0.098% |
| Tomato Powder | McCormick Code 926883 | 0.091% | 0.091% | 0.091% | 0.091% |
| Yeast | Provesta Only Flavround 5'Nucleotide | 0.084% | 0.084% | 0.084% | 0.084% |
| Citric Acid | Cargill | 0.077% | 0.077% | 0.077% | 0.077% |
| | | 100.000% | 100.000% | 100.000% | 100.000% |

Procedure for Coating Potato Chips:
1—Place potato chips in drum coater.
2—Heat chips to 120 F with heat gun.
3—Add preblended dry spice blend topically to potato chips until uniformly coated.
4—Remove chips from coater and package.

Chicken Breast
Control
60% reduced sodium (1.6:1, 1:1)
60% reduced sodium (1.6:1, 0:1)

| Reduced Salt Cooked Marinaded Chicken | | | |
|---|---|---|---|
| | Control | 60% Na Reduction KCl:NaCl Replacement 1.5, Trehalose:KCl 1.0 9 | 60% Na Reduction KCl:NaCl Replacement 1.5, Trehalose:KCl 0:0 11 |
| Chicken Breast Meat (boneless, skinless whole muscle) | 87.96% | 87.00% | 87.72% |
| Water | 8.79% | 8.79% | 8.79% |
| Ice | 2.00% | 2.00% | 2.00% |
| Sodium Tripolyphosphate (STPP) Rhodia Lot# 3713 | 0.45% | 0.45% | 0.45% |
| NaCl - Albergers Salt Flake 52774 | 0.80% | 0.32% | 0.32% |
| KCl - Reheis K4763 | | 0.72% | 0.72% |
| Trehalose - milled, Test 5 Cargill | | 0.72% | |
| | 100.00% | 100.00% | 100.00% |

Vacuum Marinade Process:
1—Dissolve phosphate in cold water first with high speed agitation.
2—Add salt, KCl, Trehalose and ice, mix thoroughly until ice is melted.
3—Place refrigerated whole muscle chicken breasts into a vacuum tumbler.
4—Add water, phosphate, salt, KCl, Trehalose solution to vacuum tumbler.
5—Place top on vacuum tumbler and draw vacuum to about 16 inches of mercury. Close vacuum and tumble chicken and solution under vacuum for 30 minutes at 9 RPM.
6—Stop tumbler, release vacuum, remove chicken.
7—Cook chicken . . . see below.

Cooking Process:
1—Heat oven to 350 F.
2—Place marinated chicken breasts on cooking tray and cover with aluminum foil.
3—Bake chicken until thickest part of chicken breast is 165 F.
3—Remove chicken from oven and cool to 40 F.
4—Cut into 1"×1" cubes, package and freeze.
5—Reheat to 165 F for evaluation.

Chili
Control
50% reduced sodium (1.6:1, 1:1)
50% reduced sodium (1.6:1, 0:1)

| Reduced Salt Chili | | | |
|---|---|---|---|
| | Control | KCl:NaCl Replacement 1.6:1, Trehalose:KCl 0:1 50% less sodium 1 | KCl:NaCl Replacement 1.6:1, Trehalose:KCl 1:1 50% less sodium 2 |
| Water | 49.77% | 49.48% | 48.71% |
| 93% Lean Ground Beef | 20.00% | 20.00% | 20.00% |
| White Onions - 3/8" diced fresh | 15.00% | 15.00% | 15.00% |
| Crushed Canned Tomatoes - Contadina | 6.00% | 6.00% | 6.00% |
| Yellow Corn Flour - Cargill Yellow Maza Flour Snack | 4.90% | 4.90% | 4.90% |
| All-purpose Flour - Pillsbury | 1.30% | 1.30% | 1.30% |
| Chili Powder - McCormick (retail) | 1.20% | 1.20% | 1.20% |
| Garlic - minced fresh | 0.50% | 0.50% | 0.50% |
| Cilantro - chopped fresh | 0.15% | 0.15% | 0.15% |
| Green Bell Pepper - 3/8" diced fresh | 0.10% | 0.10% | 0.10% |
| Black Pepper - McCormick 940037 Table Grd. | 0.06% | 0.06% | 0.06% |
| Cumin - grd. McCormick Gourmet Collection (retail) | 0.05% | 0.05% | 0.05% |
| Oregano - grd. McCormick (retail) | 0.01% | 0.01% | 0.01% |
| NaCl - Cargill Alberger Flake Lot 52774 | 0.96% | 0.48% | 0.48% |

-continued

Reduced Salt Chili

| | Control | KCl:NaCl Replacement 1.6:1, Trehalose:KCl 0:1 50% less sodium 1 | KCl:NaCl Replacement 1.6:1, Trehalose:KCl 1:1 50% less sodium 2 |
|---|---|---|---|
| KCl - Reheis K4763 | | 0.77% | 0.77% |
| Trehalose - milled, Test 5 Cargill | | | 0.77% |
| | 100.00% | 100.00% | 100.00% |

Processing:

1—Slurry water and meat in a cooking vessel until meat is thoroughly mixed.

2—Add the remaining ingredients and mix thoroughly until uniformly mixed.

3—With continuous stirring or swept surface agitation, cook mixture to 195 F and hold for 10 minutes.

4—Cool mixture to 40 F.

5—Portion chili in Zip Lock Freezer bags and freeze.

6—KEEP FROZEN until ready to use.

Preparation:

1—Remove frozen chili from package and place into sauce pan.

2—Heat chili to 165 F and serve

Method of Analysis: Samples were analyzed in a round table discussion sensory panel. Samples were assigned randomized three digit codes and analyzed individually by panelists (6 panelists for chicken breast, 8 panelists for processed cheese spread, 10 panelists for BBQ potato chips, and 8 panelists for chili). Panelists were provided with common descriptors for each product type and were asked to taste the samples and describe the characteristics of each sample on an individual ballot. Products were tasted one at a time and discussed prior to tasting the next sample. Panelists were instructed to use a water-Sprite-water rinse between each sample. At the conclusion of tasting each product type the overall conclusions were discussed and agreed upon. Panelists were asked to focus on the saltiness and were then instructed to focus on individual attributes. Panelists were given a break to rest their palette between tasting each sample type.

Conclusions:

The chicken breast products tasted were determined to have equivalent saltiness, therefore, the control, the product with trehalose, and the product without trehalose all had the equivalent salt performance. Panelists were split on overall liking of the control product and the product without trehalose, however, the product with trehalose was least preferred.

The salt performance of the BBQ potato chips was deemed to be equivalent in all three products. However, the overall flavor of the sample with trehalose was most similar to the control. The flavor of the sample without trehalose was distinctly different than the other samples.

The salt performance of the chili samples was deemed to be equivalent in all three products. The flavor of the sample without trehalose was more similar to the control than the sample with trehalose.

Example 6

Effect of Trehalose in Reduced Sodium Products Containing Sodium and Potassium Chloride Example 6.1

Preliminary Taste Tests in Finished Food Products

Based on informal taste tests in the laboratory by six tasters, the addition of trehalose (0.1% to 2% w/w) was found to improve the flavor and/or mask the off-flavor of reduced sodium products containing sodium and potassium chlorides.

Table Salt. A salt solution (1.5% w/w) was made using Morton® Lite Salt® (a mixture of sodium chloride, potassium chloride, iodide and a freeflowing agent, with 50% less sodium than regular table salt). To one part of this solution, about 0.5% w/w trehalose was added to make a first sample, and about 0.8% w/w trehalose was added to make a second sample. The solutions with and without trehalose were evaluated using sensory tests for taste. The Lite Salt® with trehalose was found to taste better than the Lite Salt® without trehalose.

Impact of Sweetness on Bitterness. Sugar was used as the sweetener and its level was adjusted in such a way that it had the same sweetness as Trehalose. Using Morton® Lite Salt®, a 1.5% (w/v) salt solution was made. Sucrose was added to this solution at a 0.5% level. The salt solution with Trehalose was compared against a control Morton® Lite Salt® solution. The taste panel (4 tasters) felt that the product with sugar tasted as bad as or worse than the product without sugar. Tasters described the taste as "dirty" compared to the metallic taste of the control.

Soup. Campbell's regular cream of chicken soup and low sodium level cream of chicken soup (Campbell's® Healthy Request® soup, which contained both sodium chloride and potassium chloride, with an advertised 30% less sodium than Campbell's® regular soups) was used for testing. Two different levels of Trehalsoe were added to the low sodium product—0.5% and 0.8% weight percent. Two tasters (food scientists) evaluated the above products against a control of low sodium soup without the addition of trehalose. Both tasters found that the soups with the addition of trehalose tasted better (masked the off taste of potassium chloride) than the commercial low sodium soup.

Bouillon Cubes. Soup was made from both regular and low sodium Herbox brand chicken cubes in accordance with package directions. Trehalose was added to the chicken broth at 0.5% weight percent levels. The two tasters found that the low sodium soup with Trehalose tasted much better than low sodium soup without Trehalose. The off taste of potassium (from potassium chloride added to low sodium soups) did not come through during the tasting of the product with Trehalose.

Broth. Swanson broth was used to evaluate if Trehalose enhanced the saltiness of the broth. Trehalose was added to the chicken broth at 0.5% and 0.8% (by weight) to see if there was an increased saltiness perception. The two tasters did not find any significant increase in saltiness perception compared to the standard product.

Example 6.2

Reduced Sodium Brines with Trehalose

Brines (2.25% w/w salt) containing sodium and potassium chlorides were made in the laboratory for tasting to see the effect of trehalose addition. Different levels of sodium reductions were tried out using potassium chloride so that saltiness is maintained. Potassium chloride levels varied from 50% to 95% of the salt blends, and the corresponding sodium chloride levels were 50% to 5%. Trehalose levels ranged from 0.2% of the salt blend for 50% salt blends to 0.95% of the salt blend for 95% potassium chloride blends. As the level of trehalose was increased for a particular salt blend (50/50 or 80/20) from low to high, tasters observed that bitterness/off-taste reached a minimum level and any level of trehalose beyond that did not have any effect of bitterness. On the other hand, saltiness, as perceived by tasters (measured by taste scores), went from low to high then to low again before reaching an optimum and falling down again. For example in 50/50 salt blends, the first high score for saltiness (acceptability) occurred at very low levels of trehalose (0.2%) and then saltiness (acceptability) perception fell down followed by optimum score for saltiness at 1.5% trehalose. At higher levels of trehalose beyond 1.5%, sweetness interfered with saltiness and the perception of saltiness was compromised.

Methodology: Different levels of Trehalose were added to a salt solution that contained both Sodium Chloride and Potassium Chloride. In the initial tests, Trehalose was added to the solution at various levels to find the optimum level that would mask the metallic taste of potassium. Samples were compared against Salt (NaCl) solution and Lite Salt (NaCl & KCl) solution at the same concentration. 2 experimenters did the evaluations.

Materials: Standard salt from stores were used in the experimentation (Morton's Salt or Cargill Evaporated Salt) unless otherwise mentioned. Anhydrous Potassium Chloride was obtained from Mallinckrodt Chemical Company. Trehalose used in the experiment was the standard product sold by Cargill.

Test 1: Determine the Level of Trehalose in 50% Reduced Salt Solutions:
Used a 2.25% (w/v) salt or low salt mixture (KCl & NaCl) solution was used for evaluation.

| Ingredient | Blend 1 | Blend 2 | Blend 3 | Blend 4 | Blend 5 |
|---|---|---|---|---|---|
| NaCl | 49.75 | 49.625 | 49.875 | 49.925 | 49.9 |
| KCl | 49.75 | 49.625 | 49.875 | 49.925 | 49.9 |
| Trehalose | 0.5 | 0.75 | 0.25 | 0.15 | 0.2 |

Evaluation: 2.25% solutions of the above mixtures were compared against Control salt solution and Lite Salt (50% KCl & NaCl) solutions. Final Trehalose concentration in the finished salt blend solutions: 0.011%, 0.017%, 0.006%, 0.0008%, & 0.0045% respectively from Blends 1 to 5.

Three tasters tasted the salt solutions for bitterness and saltiness against the two controls. Level of 0.15% Trehalose did not mask the bitter taste of potassium chloride. Salt blends with 0.2% & 0.25% Trehalose masked the bitterness and was similar to the control salt solution (only NaCl).

Test 2: Determine Trehalose Level in 80% Reduced Salt Solutions

Methodology: Replaced 80% NaCl with Potassium Chloride and tested the following levels of Trehalose in the 2.25% (w/v) salt blend solution: 0.009%, 0.0124%, & 0.016%. These products were evaluated against 2.25% (w/v) standard salt solution and also salt solution that had 80% KCl & 20% NaCl Evaluation: Of the sample salt solutions with both KCl (80%) & NaCl (20%), the salt solution with 0.009% Trehalose in the finished salt solution tasted the best with respect to least bitterness and closest in taste to control salt (NaCl) solution.

Test 3: Determine Trehalose Level in 95% Reduced Salt Solutions

Methodology: Similar to the previous method. Replaced 95% of NaCl with KCl. Trehalose levels in the finished salt blend solutions (2.25% w/v) were as follows: 0.0135%, 0.018% and 0.024%

Evaluation: Even at high levels of Trehalose (0.024%), bitterness was not as pronounced as the control salt solution that had 95% KCl and 5% NaCl (without Trehalose) but at these levels of substitution, the taste of the Lite salt solution (KCl & NaCl) was changed and was different from control salt solution (100% NaCl).

Test 4: Determination of Trehalose Levels for 60% Reduction of Sodium

Methodology: Similar to above methods. Replaced 60% of NaCl with KCl. The Trehalose levels in the finished salt blend solutions (2.25% w/v) were: 0.0057%, 0.0063%, 0.0074% & 0.0086%.

Evaluation: 0.0063% in the finished product tasted the best with respect to both masking bitterness and similar tasting to salt solution (only NaCl).

Test 5: Determination of Trehalose Levels for 65% Reduction of Sodium

Methodology: Similar to the above. Replaced 65% of NaCl with KCl. The Trehalose levels in the finished salt blend solutions (2.25% w/v) were: 0.0052%, 0.0063%, 0.0074% & 0.0086%.

Evaluation: 0.0074% in the finished product tasted the best with respect to both masking bitterness and similar tasting to salt solution (only NaCl).

Test 6: Determination of Trehalose Levels for 70% Reduction of Sodium

Methodology: Similar to the above. Replaced 70% of NaCl with KCl. The Trehalose levels in the finished salt blend solutions (2.25% w/v) were: 0.0077%, 0.0081%, 0.0086% & 0.009%.

Evaluation: 0.0086% in the finished product tasted the best with respect to both masking bitterness and similar tasting to salt solution (only NaCl).

Test 7: Effect of Trehalose % on Saltiness and Bitterness in 66% Reduced Salt Brines:

Methodology: In our previous trials, we had tested intermediate levels of Trehalose (0.0052 to 0.086%) in the finished product and found that 0.0074% Trehalose gave the best tasting low sodium brine solutions at 65% reduction in sodium. In our next trials, we reduced the salt concentration of the salt blend brines to 1.15% since tasters described the previous concentration as too salty, and also the sensitivity of the tasters was improving. The amount of salt blend mixed with water was adjusted so that all solutions had the same level of sodium and potassium chlorides. Some of the levels were repeated since it was difficult to perceive bitterness/off taste of the solutions and also there were some differences in comments among the tasters.

Evaluation: Three tasters who were involved in evaluating the products from the beginning of the project did the evaluation & tasting. It was very difficult to evaluate such minor differences in the levels of Trehalose especially in salt brine solutions. Hence, it was decided to do further sensory work using chicken broth rather than salt brine.

TABLE 6.1

| Trehalose % in finished salt blend solution | Comments |
|---|---|
| 0 | Bitter off taste |
| 0.0005 | Faint bitter taste |
| 0.0015 | Faint salty/bitter |
| 0.0037 | Salty taste/slight bitter |
| 0.0095 | Some off taste |
| 0.012 | Moderate salt taste |
| 0.017 | Good salt taste |
| 0.034 | Some off taste/less salty |
| 0.056 | Bitter taste |

Example 7

Trehalose in Chicken Broth

Methodology: Prepared a no salt chicken broth from fresh chicken; salt blends were used at 0.76% of the chicken broth.

Procedure for Making Chicken Broth: 9 to 10 lb of cut chicken and 6 quarts of cold water was brought to boil in a pot. Heat was reduced to simmer and the contents simmered for another 30 minutes. The fat layer was removed from the top. To this mixture, we added: 10 celery ribs, 1 bay leaf, 1 cup chopped onion, 1 cup chopped carrots, 12 sprigs of parsley. The pot was continued to simmer for another 2.5 hours with lid partially covered. The contents strained, and refrigerated. Before serving, any fat separating on top was removed.

66% reduced sodium blends using potassium chloride was used to test the effectiveness of Trehalose at four different levels in the finished chicken broth; 0%, 0.0019%, 0.0025% & 0.0031%.

Evaluation: The low sodium chicken broth with 0.0025% had the best overall taste with respect to saltiness and absence of bitterness. Below this level, bitterness was perceived and above that level, salt taste was compromised and tasters described the flavor as not natural.

Example 7(a)

Further Studies in Chicken Broth

Tasters found that it was easier to perceive the differences in Trehalose treatments in chicken broth and hence we did a range of Trehalose % in the finished chicken broth. It was decided to increase the salt (low sodium blend) level to 1.5% to detect small differences. Specifically, various levels of trehalose were tested in 50/50 salt blends (KCl and NaCl), and it was found that 1.5% of trehalose in the salt blend had the best overall taste. The results are presented in Table 7.1 and Table 7.2, below.

TABLE 7.1

| 50% NaCl 50% KCl | | | | |
|---|---|---|---|---|
| % Trehalose in Finished Product (w/w) | Salty taste | Bitter Taste | Off- Taste | Overall Liking |
| Salt | 6 | 0 | 0 | 8 |
| 0 | 2 | 8 | 0 | 2 |
| 0.003 | 2 | 6 | 0 | 3 |
| 0.008 | 3 | 8 | 0 | 3 |
| 0.015 | 6 | 4 | 0 | 7 |
| 0.0225 | 9 | 3 | 0 | 8 |
| 0.05 | 7 | 5 | 0 | 7 |
| 0.075 | 6 | 0 | 6 | 6 |
| 0.1 | 6 | 0 | 5 | 5 |
| 0.5 | 3 | 0 | 8 | 3 |
| 1.0 | 1 | 0 | 10 | 1 |
| 1.5 | 1 | 0 | 10 | 1 |
| 3.0 | 1 | 0 | 12 | 1 |
| 10.0 | 1 | 0 | 14 | 1 |

Solution is 1.5% salt blend with indicated amount of trehalose

TABLE 7.2

| 100% NaCl | | | | |
|---|---|---|---|---|
| % Trehalose in Finished Product (w/w) | Salty taste | Bitter Taste | Off- Taste | Overall Liking |
| Salt | 6 | 0 | 0 | 9 |
| 0.003 | 7 | 0 | 0 | 9 |
| 0.008 | 5 | 0 | 0 | 8 |
| 0.015 | 6 | 0 | 0 | 9 |
| 0.0225 | 10 | 0 | 0 | 11 |
| 0.05 | 4 | 0 | 6 | 3 |
| 0.075 | 6 | 0 | 3 | 7 |
| 0.1 | 4 | 0 | 4 | 5 |
| 0.5 | 3 | 0 | 4 | 5 |
| 1.0 | 4 | 0 | 5 | 3 |
| 1.5 | 3 | 0 | 6 | 3 |
| 3.0 | 3 | 0 | 8 | 2 |
| 10.0 | 2 | 0 | 11 | 2 |

Solution is 1.5% salt blend with indicated amount of trehalose

Sucrose was also tested as another control at reduced levels to provide the same sweetness as trehalose to verify if the bitterness masking and enhancement of saltiness is observed. It was found that there was some level of bitterness masking but saltiness was compromised leading to an off-taste even at very low levels of sucrose.

Example 7(b)

Sensory Testing in Chicken Broth

We wanted to confirm the results observed by the technical team and wanted more people to do the sensory testing of the products. Chicken broth was made as described above. A panel of 12 testers evaluated three chicken broths. Tasters tested all three samples at the same time. Specifically, a panel of 12 taste testers evaluated three chicken soup broths, a standard formula, a standard formula with 50% reduction in NaCl using KCl and a standard formula with 50% reduction in NaCl using KCl and trehalose. The broths were presented in random order. The panelists rated the samples for overall liking, liking of the flavor, bitterness intensity and saltiness intensity.

The sample of "50% reduction in NaCl using KCl" had a significantly ($p<0.05$) higher bitterness intensity score than the other two samples did. There were no other significant differences between the other products.

The results from ANOVA on the scores are provided in Table 7.3, below.

TABLE 7.3

| Attribute | 100% NaCl | 50% reduction in NaCl using KCl | 50% reduction in NaCl using KCl and trehalose | |
|---|---|---|---|---|
| Overall Liking[1] | 6.33 | 6.25 | 7.17 | 0.1479 |
| Flavor Liking[2] | 6.50 | 6.33 | 6.58 | 0.8912 |
| Bitterness Intensity[2] | 5.92[b] | 11.61[a] | 6.43[b] | 0.0272 |
| Saltiness Intensity | 33.43 | 38.53 | 31.48 | 0.2941 |

[1] 1 = "Dislike Extremely"; 2 = "Dislike Very Much"; 3 = "Dislike Moderately"; 4 = "Dislike Slightly"; 5 = "Neither Like nor Dislike"; 6 = "Like Slightly"; 7 = "Like Moderately"; 8 = "Like Very Much"; 9 = "Like Extremely"
[2] 1.4 = "barely detectable"; 6.1 = "weak"; 17.2 = "moderate"; 35.4 = "strong"; 53.3 = "very strong"; 100 = "strongest imaginable"

Example 8

The inventors have found that trehalose can have one or more effects in salty and/or savory products, including: (A) improved flavor of low sodium food products that had both sodium and potassium chlorides at very low levels of trehalose (e.g. less than 0.05% in the finished food products); (B) enhanced perception of saltiness at very low levels of trehalose (e.g. less than 0.05% in the finished food products); and (C) enhanced flavor perception of certain savory flavors in food products that had regular or reduced sodium levels.

Example 8.1

Effect of Trehalose in Enhancing Saltiness

The effect of saltiness enhancement was studied using very low levels of trehalose to high levels of trehalose. Initial findings indicate that trehalose at 0.0225% in the finished product (equivalent of 1.5% in salt blend) enhanced the saltiness the most and the saltiness perception showed a pattern (low to high to low to optimum to low) similar to the study with salt blend (sodium and potassium chlorides).

In the next set of trials, the level of enhancement due to trehalose in chicken broth was evaluated by comparing chicken broths that had a blend of salt and trehalose against those that had various levels of salt alone. In initial trials, it was found that the level of salt enhancement was close to 20% when trehalose was used along with salt (the product with 1.5% salt blend (salt and trehalose) tasted as salty as that product with 1.8% salt alone).

Example 8.2

Effect of Trehalose in Enhancing Savory Character

In studies with chicken broth, tomato juice (contained both sodium and potassium chlorides), tomato soup, pickles, chicken base (as provided by Five Star Foods), it was found that the addition of trehalose brought out the characterizing flavor of the above products in addition to enhancing saltiness and masking undesirable flavors. The tasters who tasted the various products mentioned a difference in the perception of the overall flavor of the product in terms of savory character. Also, when the products with trehalose were compared to those that had comparable salt, tasters perceived a much smoother delivery of flavor (for example in the dill pickle, the dill flavor in the trehalose added product had less flavor spikes when eating a individual pickle pieces).

In initial trials, tasters sampled chicken broth and other savory food products such as tomato juice, chicken base, etc. with trehalose against products without trehalose. The addition of trehalose enhanced the savory flavor of the products (chicken or tomato flavor) when compared to products that did not have trehalose. A low sodium broth with trehalose was also compared against a broth without sodium reduction. It was found that the savory character of the broth with trehalose was better than that of the corresponding product without trehalose. The optimum level of trehalose that showed this effect was below 0.05% and the flavor enhancing effect varied with the level of trehalose.

Example 9

Other Food Products

Example 9.1

Dill Pickles

Dill Pickle was made using brines with regular and reduced sodium brines. The products with reduced sodium (50% reduction) and trehalose scored as well as products with regular levels of sodium and the product without trehalose had an off-flavor.

Methodology: In this experiment Dill Pickles were made with salt and 50% Reduced sodium blends with and without Trehalose. Trehalose was used at levels of 0.015% in the brine used for pickling. The formula for the brine & also the ratio of cucumber to brine are given below. The products were packed in glass jars and pasteurized at 165 F.

| | Supplier | Information | % Brine | % |
|---|---|---|---|---|
| Ingredients for Brine | | | | |
| Water | | | 69.93 | |
| Vinegar | Heinz | 5% Acidity | 24 | |
| Salt or Low Sodium Blend | | | 5.75 | |
| Kosher Dill Pickle Spice | Kalsec | | 0.1 | |
| Calcium Chloride | EMD | | 0.2 | |
| Turmeric | McCormick | | 0.02 | |
| Ingredients for Pickle | | | | |
| Cucumbers | | | | 59.91 |
| Brine | | | | 39.94 |
| Diced Garlic | | | | 0.1 |
| Dill Seed | | | | 0.005 |

Evaluation: Four tasters evaluated the product. Three tasters chose the Trehalose containing product, as the best tasting product and one person liked the control best. All the four tasters described the taste of the product without Trehalose as having a bitter/off taste.

Example 9.2

Lo-Carb Dry Mix Soup

Methodology: One trial of a Dry Potato Soup Mix was used as a model system to further study the effect of Trehalose. The following salt & salt blends were used in the mix for evaluation: 80% Reduced Sodium Blend (80 g KCl, 20 g NaCl blend with 0.4 g Trehalose), 50% Reduced Sodium Blend (50 g NaCl, 50 g KCl with 0.2 g Trehalose), Morton Lite Salt (50% NaCl & 50% KCl).

Lo Carb Dry Mix was made up of the following ingredients:

| Ingredients | Percentages |
| --- | --- |
| Kerry Kream 277* | 57.51 |
| Prolisse 1103 ** | 38.34 |
| Potato Flavor Wild FAFF 571 | 2.60 |
| Salt | 1.55 |

In the above formula, salt was replaced by the salt blends & Morton lite salt.

Evaluation (3 tasters): 50% Reduced salt blend tasted the best in overall taste with respect to least bitterness and most salty taste.

Example 9.3

Potato Chips

Methodology: In order to disperse the salt 1-2 gm of salt or salt blend in 100 gm of chips, we mixed with the salt with a carrier such as maltodextrin. Two different DE (dextrose equivalent with differing sweetness) of maltodextrins were tried out—18 & 7.5 DE. We found that 7.5 DE was the acceptable type of maltodextrin for this application.

Trehalose levels in the salt blends were as follows: 0.2 g of Trehalose/50 gm of KCl/50 gm of NaCl for 50% Reduced sodium sample, 0.33 gm of Trehalose/65 gm of KCl/35 gm of NaCl, 0.95 gm of Trehalose/95 gm of KCl/5 gm of NaCl. The finished Trehalose percentages in chips were as follows: 0.004% for 50% reduction, 0.007% for 65% reduction in sodium and 0.019% for 95% reduction of sodium.

0.5 gm of salt blend was added to 2.5 gm of 7.5 DE maltodextrin. This mixture was added to 50 gm of unsalted potato chips in a Ziploc plastic bag & thoroughly shaken for the seasoning blend to mix. In all the following tests, low sodium salt blends were made using potassium chloride (1 part of sodium chloride was replaced by 1 part of potassium chloride on a mass basis). Unsalted potato chips were salted with low sodium salt blends with and without Trehalose.

Evaluation (done by 4 tasters): 50% Reduction of sodium: It was difficult to distinguish between the chips salted with low sodium blends with trehalose and without trehalose since the products without trehalose did not have the off taste of potassium due to the high fat 65% Reduction in sodium: The tasters could not perceive differences in the taste between the potato chips salted with low sodium blends with and without trehalose. It was decided to increase the salt reduction levels.

95% Reduction in sodium: The tasters perceived an off taste in both the chips with and without Trehalose but the chips with trehalose tasted saltier & had a lesser off taste than the product that did not have trehalose.

Example 9.4

Seasoning Blends

Methodology: A seasoning blend was created for use in snack products. The formula for such a blend is given below:

| Ingredients | Supplier | Percentage | Information |
| --- | --- | --- | --- |
| Maltodextrin | Cargill | 52.25 | 10 DE |
| Salt or Salt Blend | | 25 | |
| Autolyzed Yeast | Provesta | 10 | Ohly STT Savory |
| Onion Powder | McCormick | 5 | |
| Paprika | McCormick | 2.5 | |
| Garlic Powder | Monarch | 1.5 | |
| Chili Powder | McCormick | 1.5 | |
| Flow Agent | Degussa | 1 | Sipernat 225 |
| Citric Acid | Cargill | 0.75 | |
| Cumin Powder | McCormick | 0.125 | |
| Black Pepper | McCormick | 0.125 | |
| Celery Seed | McCormick | 0.125 | |
| Red Pepper | McCormick | 0.125 | |

We used the above seasoning blend to do trials of 80% Sodium reduction in potato chips. In the place of salt in the above formula, we used the low sodium blend with 80% KCl and 20% NaCl and 0.4 g of Trehalose. 1 gm of seasoning blend was mixed with 3 gm of 7.5 DE maltodextrin (carrier) & the combined mixture was added to 50 gm of unsalted potato chips (bought from the stores). A control without the Trehalose (low sodium blend without Trehalose) was also made for comparing against test product. The level of Trehalose in the finished food product was 0.008%

Evaluation: The tasters (four in number) perceived the off taste in the product without trehalose while the product with trehalose did not have such an off taste. However, the salty taste was faint.

Example 9.5

Low Sodium Application in Freshly Made Potato Chips

Methodology: Same seasoning blend was used & the seasoning was applied to freshly made potato chips from potatoes (slice potatoes in 1/16 inch thickness, heat in Frymax vegetable oil at 330 F till the slices become brown). Four trials were run; 80% reduction in sodium (80% KCl & 20% NaCl) with and without Trehalose and 95% reduction in sodium with and without Trehalose.

Evaluation: The 80% reduced sodium product with trehalose was the best tasting product without any bitterness and good salty taste. The products without trehalose had noticeable bitterness especially the product with 95% reduction in sodium without trehalose. The 95% reduced sodium product with trehalose had some bitterness.

Example 9.6

Sensory Testing in Potato Chips

Methodology: Later experiments in potato chips were conducted using "No Salt Added" chips from the market. Chips with No Salt added were fed in to a coating drum, and chips were heated by directing hot air from the dryer to the outside of the drum. When chips get warm and the oil droplets start appearing on the surface of the chips, salt (or salt blend) is added using a shaker uniformly over all the chips.

Specifically, consumer reaction to reduced-sodium potato chips was measured on six different chip samples. Samples were presented monadically over a six day-period. Participants picked up their chip samples at 10:00 am, consumed them at their leisure and recorded their results by 5:00 pm the same day.

The table below gives some summary statistics for the results. Letter superscripts in the Overall liking results are the LSD groupings. Samples A and B had significantly (p<0.05) higher overall liking scores than samples D and E did. The difference between samples B and C is not statistically significant at the 95% level, but is at the 90% level. This provides some evidence that Trehalose provides some benefit in terms of overall liking at the 33% sodium reduction level.

|  |  | Sample | | | | |
| --- | --- | --- | --- | --- | --- | --- |
|  |  | 33% Sodium Reduction | | 50% Sodium Reduction | | 33% Sodium Reduction with |
| Attribute | Control (A) | With Trehalose (B) | Without Trehalose (C) | With Trehalose (D) | Without Trehalose (E) | Only Sodium Chloride and Trehalose (F) |
| Overall liking[3] | 7.27$^a$ | 7.24$^a$ | 6.87$^{ab}$ | 6.27$^d$ | 6.51$^{bcd}$ | 6.84$^{abc}$ |
| % ≧7 | 82.1% | 79.4% | 73.7% | 56.1% | 58.1% | 72.4% |
| % ≦4 | 8.9% | 6.5% | 12.3% | 25.2% | 16.2% | 19.0% |
| Purchase Intent[4] | 60.7% | 59.8% | 51.8% | 39.3% | 40.0% | 57.1% |
| Substitute[5] | 22.3% | 17.8% | 14.0% | 10.3% | 10.5% | 22.9% |

[4]Percent in top two boxes on a 5-point scale.
[5]The sample was an acceptable substitute for my normal brand (%)

Example 10

Tomato Soup

Many of the tomato products in the market have a large amount of salt and we wanted to test our technology in a tomato-based soup.

Methodology: We developed a formula that is similar to some of the tomato soups that are available in the market. The formula for the Tomato Soup Control is given below:

| Ingredient Specification | % |
| --- | --- |
| Tomato Soup | 28 |
| Sugar, Granulated | 1.47 |
| Water | 64.78 |
| Soybean oil | 1.15 |
| Modified Corn Starch, Cerestar, Hi Form 12747 | 0.6 |
| Corn syrup solids | 2 |
| Wheat Flour, white, all purpose | 2 |
| Salt | 1 |
| Potassium Chloride | 0 |
| Trehalose | 0 |

50% reduced sodium tomato soup was made using a mixture of sodium and potassium chloride (0.5% each) and in the 50% reduced sodium soup with Trehalose, the level of Trehalose used was 0.015%. The products were processed using pressure cooker at 15 psi for 10 min.

The following levels of Trehalose percentages in the finished product were tried; Control with salt, 0.0033%, 0.01%, 0.015%, 0.031%, 0.053%, 0.11%, & 0.25%. The amounts of salt blend were adjusted so that the salt blend level was the same across all the treatment (to compensate for the various levels of Trehalose in the salt blend).

Evaluation: Three experienced tasters tasted the products and the top two products in terms of overall liking was those products that had final Trehalose levels of 0.0033% & 0.015% respectively. Trehalose level at 0.053% had a good score in overall liking by two tasters but the saltiness was compromised.

Sensory Testing of Tomato Soup: Further testing was done with tomato soup by consumers (Cargill employees). The panelists tasted all the three soups (control, 50% reduced sodium product without Trehalose and 50% reduced product with Trehalose) at the same time. The soups were rated on a 9-point hedonic scale[6]. The soups were presented in randomized order and served at comparable temperatures. Analysis of variance was used to test for differences between the samples, and the results are shown below.

[6] 1="Dislike Extremely"; 2="Dislike Very Much"; 3="Dislike Moderately"; 4="Dislike Slightly"; 5="Neither Like nor Dislike"; 6="Like Slightly"; 7="Like Moderately", 8="Like Very Much"; 9="Like Extremely"

Overall Liking Summary

| Product | Mean* | % ≦4 | % ≧7 |
| --- | --- | --- | --- |
| Soup with NaCl | 6.24$^A$ | 26% | 62% |
| Soup with NaCl and KCl | 5.40$^B$ | 38% | 32% |
| Soup with Trehalose | 5.28$^B$ | 40% | 46% |

*Means with the same letter are not significantly different. (p < 0.05)

As shown the sample with NaCl scored significantly higher than the other two samples. None of the samples had particularly high scores.

Comments: The results showed that the there was no significant difference between the low sodium product with and without Trehalose. The products were tasted by project team members (with experience in tasting low sodium products) and only thing the team members found was that the taste of the low sodium tomato soup with trehalose was different from the control (100% salt) product in it's flavor also. The Trehalose seemed to have affected not only the potassium chloride taste but also the tomato soup profile of the product. When tasters tasted all the three products (control and two samples with lower sodium content), they found that the product with Trehalose was more different from control than product without Trehalose. This seemed to have affected the scores also.

Example 11

Chicken Soup

Methodology: We developed a chicken soup formula for testing by consumers using a formal monadic (sensory testing of only one soup at a time) testing. The formulas tested are set forth in Example 1.

The table below gives the summary statistics for overall liking, flavor liking and saltiness liking.

Summary Liking Statistics

|  |  | Overall Liking | | Flavor Liking | | Saltiness Liking | |
| --- | --- | --- | --- | --- | --- | --- | --- |
| Treatment | N | Mean | SE | Mean | SE | Mean | SE |
| High Trehalose - 50% Reduction | 102 | 6.04 | 0.19 | 6.08 | 0.19 | 5.89 | 0.19 |
| Low Trehalose - 50% Reduction | 108 | 6.21 | 0.18 | 6.40 | 0.17 | 6.29 | 0.16 |
| No Trehalose - 50% Reduction | 111 | 5.58 | 0.21 | 5.50 | 0.21 | 5.56 | 0.18 |
| Salt Control | 111 | 5.94 | 0.22 | 6.00 | 0.21 | 6.26 | 0.19 |
| Wixon - 30% Reduction | 98 | 5.91 | 0.23 | 6.10 | 0.23 | 5.77 | 0.21 |

Analysis of variance with Tukey's honest significant difference (HSD) revealed the following significant differences between the treatments.

Flavor Liking: Low Trehalose significantly higher (better) than No Trehalose (p<0.05).

Saltiness Liking: Low Trehalose significantly higher (better) than No Trehalose (p<0.05).

Salt Control significantly higher (better) than No Trehalose ($0.05 \leq p \leq 0.10$)

No other significant differences were found. Appendix 2 contains histograms of the overall liking scores for each treatment.

The table below gives the flavor JAR scores for all samples. Note that the percent of panelists that felt that the broth had too little flavor was relatively low for Wixon.

Flavor JAR Scores

| Flavor Amount JAR | Salt Control | High Trehalose | Low Trehalose | No Trehalose | Wixon |
| --- | --- | --- | --- | --- | --- |
| Much too little | 13% | 15% | 11% | 22% | 10% |
| A little too little | 24% | 35% | 31% | 23% | 19% |
| Just about right | 56% | 38% | 49% | 41% | 55% |
| A little too much | 5% | 10% | 7% | 9% | 12% |
| Much too much | 3% | 2% | 2% | 5% | 3% |

The table below gives the saltiness JAR scores for all samples. Note that the JAR profiles are very similar for all five samples, and there were no significant differences in saltiness JAR scores between the treatments.

Saltiness JAR Scores

| Saltiness Amount JAR | Salt Control | High Trehalose | Low Trehalose | No Trehalose | Wixon |
| --- | --- | --- | --- | --- | --- |
| Much too little | 5% | 5% | 3% | 8% | 5% |
| A little too little | 14% | 23% | 18% | 19% | 10% |
| Just about right | 63% | 55% | 61% | 52% | 57% |
| A little too much | 14% | 12% | 17% | 16% | 21% |
| Much too much | 4% | 6% | 2% | 5% | 6% |

There were no significant differences between the treatments with respect to aftertaste and bitterness scores as shown in the tables below.

Aftertaste Scores

| Score | Salt Control | High Trehalose | Low Trehalose | No Trehalose | Wixon |
| --- | --- | --- | --- | --- | --- |
| none | 13% | 16% | 12% | 14% | 19% |
| 1 | 16% | 15% | 17% | 15% | 13% |
| 2 | 13% | 14% | 17% | 13% | 8% |
| 3 | 14% | 10% | 8% | 10% | 9% |
| 4 | 11% | 11% | 8% | 7% | 11% |
| 5 | 9% | 11% | 8% | 7% | 7% |
| 6 | 8% | 7% | 9% | 13% | 11% |
| 7 | 5% | 9% | 15% | 7% | 8% |
| 8 | 5% | 4% | 2% | 6% | 2% |
| 9 | 2% | 3% | 1% | 2% | 3% |
| extremely strong | 4% | 2% | 3% | 5% | 7% |

Bitterness Scores

| Score | Salt Control | High Trehalose | Low Trehalose | No Trehalose | Wixon |
| --- | --- | --- | --- | --- | --- |
| none | 42% | 35% | 44% | 34% | 40% |
| 1 | 23% | 25% | 18% | 23% | 17% |
| 2 | 11% | 11% | 17% | 9% | 15% |
| 3 | 6% | 9% | 4% | 7% | 9% |
| 4 | 3% | 6% | 6% | 6% | 2% |
| 5 | 7% | 10% | 7% | 6% | 6% |
| 6 | 2% | 2% | 2% | 7% | 5% |
| 7 | 5% | 3% | 2% | 2% | 3% |
| 8 | 1% | 0% | 1% | 2% | 2% |
| 9 | 1% | 0% | 0% | 1% | 0% |
| extremely strong | 0% | 0% | 1% | 2% | 0% |

Example 12

Enhancement of Saltiness using Trehalose

Initial Salt Brine Tests:

We also studied the effect of saltiness enhancement of Trehalose. In our initial studies, we used salt brine at 1.12% salt. The Trehalose levels were varied as below:

We first wanted to find out what level of Trehalose has the maximum impact on saltiness & then compare this data with different controls (only salt without Trehalose) to understand how much enhancement occurs using Trehalose.

| Trehalose % in finished salt blend solution | Saltiness scale (1 - least salty & 9 - extremely salty) |
|---|---|
| 0.0037 | 3 |
| 0.011 | 4 |
| 0.0168 | 5 |
| 0.0034 | 2 |
| 0.056 | 2 |
| 0.09 | 1 |
| 0.13 | 1 |

Chicken Broth Test:

Methodology: Chicken Broth was made as mentioned above. Trehalose was added at different levels. The salt amount was adjusted for the addition of Trehalose so that same level (1.5% Salt) was added to all the samples.

| | 100% NaCl | | | |
|---|---|---|---|---|
| % Trehalose Finished Product | Salty taste | Bitter Taste | Off Taste | Overall Liking |
| Salt | 6 | 0 | 0 | 9 |
| 0.003 | 7 | 0 | 0 | 9 |
| 0.008 | 5 | 0 | 0 | 8 |
| 0.015 | 6 | 0 | 0 | 9 |
| 0.0225 | 10 | 0 | 0 | 11 |
| 0.05 | 4 | 0 | 6 | 3 |
| 0.075 | 6 | 0 | 3 | 7 |
| 0.1 | 4 | 0 | 4 | 5 |
| 0.5 | 3 | 0 | 4 | 5 |
| 1.0 | 4 | 0 | 5 | 3 |
| 1.5 | 3 | 0 | 6 | 3 |
| 3.0 | 3 | 0 | 8 | 2 |
| 10.0 | 2 | 0 | 11 | 2 |

Evaluation: Four tasters tasted the samples & the chicken broth with 0.0225% Trehalose had the best overall taste and also increased the saltiness much more than any other levels without sacrificing any other desirable taste properties.

Determination of the Trehalose Enhancement of Saltiness:

Methodology: We took the best-case scenario of salt enhancement in Chicken Broth (0.0225% of Trehalose) compared to different levels of salt controls. The salt level of chicken broth studied was 1.5% and this salt level with Trehalose (0.0225%) was compared (using taste tests) against higher levels of salt without Trehalose to understand the level of enhancement. The salt levels used were 1.8%, 1.9% and 2% salt.

Evaluation: Two tasters tasted the product and found that chicken broth with 1.5% salt with Trehalose (0.0225%) tasted similar to 1.8% salt without any Trehalose.

Example 13

The invention being thus described, it will be apparent to those skilled in the art that the same may be varied in many ways without departing from the spirit and scope of the invention. Such variations are included within the scope of the invention to be claimed.

| Alfredo Sauce | |
|---|---|
| | 50% Na Reduction |
| Water | 40.62% |
| Half & Half | 35.00% |
| Parmesan Cheese -shredded | 15.00% |
| Butter - unsalted | 5.00% |
| Modified Corn Starch | 2.50% |
| Onion Powder | 0.10% |
| Garlic Powder | 0.10% |
| Na Cl - Cargill Alberger Flake Lot 52774 | 0.40% |
| KCl - Reheis K4763 | 0.64% |
| Trehalose - milled, Test 5 Cargill | 0.64% |
| | 100.00% |

Process:
1—Add water and half and half into cooking vessel.
2—Blend dry ingredients and incorporate into liquids.
3—With continued stirring cook mixture to 195 F.
4—Add butter and parmesan cheese and mix in thoroughly.
5—Heat mixture to 195 and hold for 5 minutes.
6—Cool mixture to 40 degrees.
7—Place sauce into containers and freeze.

Sauce Preparation:
1—Remove frozen sauce from container and heat in sauce pan to 165 F.

Example 14

| Beef Jerky | |
|---|---|
| | 50% Reduced Salt |
| Beef - Eye of Round | 87.54% |
| Salt | 0.80% |
| Onion Powder | 0.20% |
| Garlic Powder | 0.20% |
| Black Pepper -grd. | 0.20% |
| Soy Sauce | 4.00% |
| Brown Sugar | 2.50% |
| Hickory Liquid Smoke | 2.00% |
| KCl | 1.28% |
| Trehalose | 1.28% |
| | 100.00% |

Marinading Process:
1—Cut beef (32 F-38 F) into ⅛" thick strips removing all fat and connective tissue.
2—Pre-blend all dry ingredients.
3—Preweigh all liquid ingredients.
3—In a stainless steel bowl, add meat and liquid ingredients and mix until uniformly blended.
4—Next add all the dry ingredients and mix until uniformly blended.
5—Remove seasoned meat from bowl and place into heavy plastic bag.
6—Let the meat marinade for 4 hours under refrigerated conditions.

Drying Process:
1—Remove meat from bag.
2—Place marinaded strips on dehyrator trays in even, single layers.

3—Place trays in dehydrator.
4—Set temperature control to 155 F and turn on dehydrator.
5—Dry meat until the finished product has a Aw<0.76. Drying time is approximately 3-4 hours and the yield is approximately 40%-45% of its green weight.
6—Put dried jerky into a sealed container and keep refrigerated until used.

Example 15

| Creamed Spinach | |
|---|---|
| | 25% Less Sodium |
| Spinach, IQF | 50.647% |
| Half & Half | 24.210% |
| Whole Milk | 13.990% |
| Seasoning Blend | 2.630% |
| Butter, Lightly Salted | 2.600% |
| Diced Onion, IQF | 2.350% |
| Water | 1.930% |
| Salt | 0.463% |
| Canola Oil | 0.460% |
| KCl - Reheis K4763 | 0.360% |
| Trehalose, unmilled Hayashibara Lot 0601265A261 | 0.360% |
| | 100.000% |

Process:
1—Pre-weigh all ingredients
2—In top of double boiler, add Half & Half, Whole Milk and water.
3—With agitation, add seasoning blend. Mix until thoroughly incorporated.
4—Add onions, salt, butter.
5—Bring water to boil in bottom of double boiler. Insert top of double boiler and Heat mixture to 190 F. Hold 5 minutes.
6—Add Frozen Spinach and mix in thoroughly.
7—Package and Freeze.

Example 16

| Chicken Broth | |
|---|---|
| | 33% Reduced Sodium |
| Water | 93.763% |
| Chicken Stock Base (w/o Added Salt) | 3.500% |
| Beta-Carotene 1% Powder, CWS 16,670 IU | 0.010% |
| Modified Food Starch Cargill 06727 | 0.700% |
| Onion Powder | 0.250% |
| Aquaresin Black Pepper Code: 03-20-19 | 0.015% |
| Aquaresin Celery, Sweet Code: 09-07-19 | 0.020% |
| Aquaresin Rosemary Code 19-01-19 | 0.015% |
| Na Cl - Cargill Alberger Flake Lot 52774 | 0.708% |
| KCl - Reheis K4763 | 0.509% |
| Trehalose - unmilled, Hayashibara | 0.509% |
| | 100.000% |

Process:
1—Place water into a cooking vessel.
2—Add remaining ingredients and stir together until thoroughly mixed.
3—Heat mixture to 195 F and hold for 5 minutes.
3—Cool to 40 F and place into containers and freeze.

Preparation:
1—Remove frozen stock from containers and place into sauce pan.
2—Heat stock to 165 F and serve.

Example 17

| Chicken Gravy | |
|---|---|
| | 33% Reduced Sodium |
| Water | 80.306% |
| 10DE Maltodextrin Cargill MD1960 | 5.000% |
| Butter - unsalted | 5.000% |
| Chicken Stock Base (w/o Added Salt) Five Star | 3.500% |
| Modified Food Starch Cargill 06727 | 3.000% |
| Na Cl - Cargill Alberger Flake | 0.710% |
| NFDMS - Low Heat | 1.000% |
| Onion Powder, Atlantic | 0.300% |
| Garlic Powder, Atlantic | 0.050% |
| Xanthan Gum Keltrol F | 0.050% |
| Aquaresin Celery, Sweet Code: 09-07-19 | 0.030% |
| Aquaresin Black Pepper Code: 03-20-19 | 0.015% |
| Aquaresin Rosemary Code 19-01-19 | 0.015% |
| Beta-Carotene 1% Powder, CWS 16,670 IU Roche | 0.010% |
| KCl - Reheis K4763 | 0.507% |
| Trehalose - unmilled, Hayashibara | 0.507% |
| | 100.000% |

Process:
1—Place water into a cooking vessel.
2—Add remaining ingredients and stir together until thoroughly mixed.
3—Heat mixture to 195 F and hold for 5 minutes.
3—Cool to 40 F and place into containers and freeze.
Preparation:
1—Remove frozen stock from containers and place into sauce pan.
2—Heat stock to 165 F and serve.

Example 18

| Chili | |
|---|---|
| | 33% Reduced Sodium |
| Water | 30.291% |
| 93% Lean Ground Round | 30.000% |
| Tomato Paste - Contadina | 5.000% |
| White Onions - ⅜" diced fresh | 6.000% |
| Pinto Beans - JOA | 12.000% |
| Dark Kidney Beans - JOA | 4.000% |
| Celery - ⅜" diced fresh | 5.000% |
| Green Bell Pepper - ⅜" diced fresh | 4.000% |
| Sugar | 1.000% |
| Chili Powder - McCormick (retail) | 1.000% |
| Salt | 0.419% |
| Onion Powder | 0.300% |
| Garlic powder | 0.200% |
| Black Pepper - McCormick 940037 Table Grd. | 0.060% |
| KCl | 0.365% |
| Trehalose | 0.365% |
| | 100.000% |

Process:
1—Place water and und round into cooking vessel and stir mixture to uniform mass.

2—Add remaining ingredients and begin cooking process.
3—Cook chili mixture to ground round into cooking vessel and stir mixture to uniform mass.
2—Add remaining ingredients and begin cooking process.
3—Cook chili mixture to 195 F and hold for 10 minutes.
4—Remove from heat and hot fill into containers and Freeze.

Example 19

| Cooked Marinaded Chicken Breast | |
|---|---|
| | 30% Na Reduction |
| Chicken Breast Meat (boneless, skinless whole muscle) | 87.44% |
| Water | 8.79% |
| Ice | 2.00% |
| Sodium Tripolyphosphate (STPP) Astaris 188 Lot 221020237 | 0.45% |
| NaCl - Albergers Salt w ShurFlo 52494E | 0.56% |
| KCl - Reheis K4763 | 0.38% |
| Trehalose - milled, Test 5 Cargill | 0.38% |
| | 100.00% |

Equipment: Lab top vacuum marinade system. Daniels Food Equipment Model DUTS 15 Tumbler
Vacuum Marinade Process:
1—Dissolve phosphate in cold water first with high speed agitation.
2—Add salt, KCl, Trehalose and ice, mix thoroughly until ice is melted.
3—Place whole muscle chicken breasts that have been sliced half way through and slices 1" apart in vacuum tumbler.
4—Add water phosphate, salt, KCl, Trehalose solution per formula.
5—Place top on vacuum tumbler and draw vacuum to about 16 inches of mercury. Close vacuum and tumble chicken and solution under vacuum for 30 minutes at 4-5 RPM.
6—Stop tumbler, release vacuum, remove chicken and record Tumbler Yields.
7—Cook chicken . . . see below.
Cooking Process:
1—Heat oven to 350 F.
2—Place marinaded chicken breasts on cooking tray and cover with aluminum foil.
3—Bake chicken for 25-30 minutes or until thickest part of chicken breast is 165 F.
3—Remove chicken and record cooked weights.
4—Cool and cut into 1"×1" cubes, package and freeze.
5—Reheat to 160 F for evaluation.

Example 20

| | 30% Reduced Salt |
|---|---|
| French Fries, IQF Retail | 98.075% |
| Albergers Fine Flake Salt | 0.875% |
| KCl | 0.525% |
| Trehalose-milled | 0.525% |
| | 100.000% |

Procedure:
1—In a small deep fat fryer filled with Canola Oil and heated to 365 F, fry IQF French Fries for 3.5 minutes.
2—Remove fries from oil, shake excess oil from fries and place in a tray.
3—Sprinkle with salt/KCl/trehalose mixture.

Example 21

| | 33% Less Sodium |
|---|---|
| Quick 1-Minute Oats | 65.018% |
| Light Brown Sugar | 32.509% |
| Na Cl - Cargill Alberger Fine Flake | 1.065% |
| KCl - Reheis | 0.704% |
| Trehalose - unmilled, Hayashibara | 0.704% |
| | 100.000% |

To Make Dry Oatmeal Cereal Blend: Mix together all the dry ingredients.
To Prepare Finished Cooked Cereal: Use ½ cup dry blend with 1 cup of boiling water. Let set for five minutes.

Example 22

| Cheese Spread | |
|---|---|
| | 33% Less Sodium |
| Cheese, Cheddar | 14.00% |
| Cheese, Cheddar | 28.00% |
| Enzyme modified cheese | 0.30% |
| Salt | 0.32% |
| KCl | 1.53% |
| Trehalose | 1.53% |
| Butter (unsalted) | 5.00% |
| Milk powder, NFDM | 2.00% |
| Whey powder, sweet | 2.00% |
| Carageenan, Viscarin, 109F | 0.70% |
| Trisodium Citrate | 1.00% |
| Disodium Phosphate | 1.00% |
| Citric acid | 0.18% |
| Milk protein conc., 70% | 1.50% |
| Water | 40.94% |
| | 100.00% |

Process Procedure:
Equipment: Double boiler w Lid, cheese grater.
1—Grate cheddar cheese using coarse shredding blade.
2—Pre-weigh all ingredients.
3—Dry blend together: Enzyme mod. Cheese powder, salt, (as needed KCl, Trehalose), NFDMS, Whey, Carageenan, Tri-sodium citrate, Disodium Phosphate, Milk protein conc.
4—In 10% of the water, dissolve the citric acid and place off to the side.
5—In the top of the double boiler, add the remaining formula water.
6—With high speed agitation, slowly add the dry blend to the water until thoroughly blended.
7—While stirring, begin to heat mixture.
8—Stir in cheddar cheese and butter and continue stirring until cheese is melted and becomes smooth and glossy.
9—Heat mixture to 175 F and hold for 5 minutes.
10—Slowly add water/citric acid solution to cheese mixture and mix until thoroughly incorporated.
11—Remove mixture from heat, HOT fill into containers and store Refrigerated.

Example 23

| Mozzarella Cheese Spread | 33% Less Sodium |
|---|---|
| Water | 36.240% |
| Mozzarella | 30.000% |
| Parmesan | 15.000% |
| Enzyme modified cheese powder | 0.000% |
| Butter (unsalted) | 6.000% |
| Milk powder, NFDM | 2.500% |
| Whey powder, sweet | 2.500% |
| Carageenan, Viscarin, 109F | 0.700% |
| Trisodium Citrate | 0.900% |
| Disodium Phosphate | 0.900% |
| Citric acid | 0.100% |
| Milk protein conc., 70% | 2.000% |
| Salt | 0.300% |
| KCl | 1.430% |
| Trehalose | 1.430% |
| | 100.000% |

Process Procedure:
Equipment: Double boiler w Lid, cheese grater.
1—Grate cheese using coarse shredding blade.
2—Pre-weigh all ingredients.
3—Dry blend together: Enzyme mod. Cheese powder, salt, (as needed KCl, Trehalose), NFDMS, Whey, Carageenan, Tri-sodium citrate, Disodium Phosphate, Milk protein conc.
4—In 10% of the water, dissolve the citric acid and place off to the side.
5—In the top of the double boiler, add the remaining formula water.
6—With high speed agitation, slowly add the dry blend to the water until thoroughly blended.
7—While stirring, begin to heat mixture.
8—Stir in Mozzarella and Parmesan cheese and butter and continue stirring until cheese is melted and becomes smooth and glossy.
9—Heat mixture to 175 F and hold for 5 minutes.
10—Slowly add water/citric acid solution to cheese mixture and mix until thoroughly incorporated.
11—Remove mixture from heat, HOT fill into containers and store Refrigerated.

Example 24

| Zesty Italian Salad Dressing | 33% Less Sodium |
|---|---|
| Water | 21.096% |
| Cider Vinegar 5% Acidity | 36.900% |
| Canola Oil | 30.000% |
| Sugar | 6.500% |
| Salt | 2.010% |
| Garlic - dried minced | 0.500% |
| Onion - dried minced | 0.200% |
| Xanthan Gum | 0.100% |
| Black Pepper | 0.100% |
| Oregano - Whole Leaf | 0.020% |
| KCl - Reheis K4763 | 1.287% |
| Trehalose - unmilled, Hayashibara | 1.287% |
| | 100.000% |

Process:
1—Preblend Xanthan Gum with Sugar.
2—With high agitation, slowly add gum/sugar blend to cold water until gum is thoroughly hydrated.
3—Add vinegar and mix thoroughly.
4—Add remaining dry ingredients and mix in thoroughly.
5—Add oil.
6—Store at refrigerated temperatures.
Oil and water will exhibit phase separation until shaken. This is typical for this type of salad dressing. Some amount of garlic and onion will be suspended in water phase with some settling over time.
Shake Well before serving.

Example 25

| Zesty Italian Fat Free Salad Dressing | 33% Less Sodium |
|---|---|
| Water | 63.8904% |
| Cider Vinegar 5% Acidity | 24.0000% |
| Sugar | 6.0000% |
| Salt | 2.1440% |
| Garlic - dried minced | 0.5000% |
| Onion - dried minced | 0.2000% |
| Xanthan Gum | 0.2000% |
| Viscarin 389 | 0.2000% |
| Black Pepper | 0.1000% |
| Oregano - Whole Leaf | 0.0200% |
| KCl - Reheis K4763 | 1.3728% |
| Trehalose - unmilled, Hayashibara | 1.3728% |
| | 100.0000% |

Process:
1—Preblend Xanthan Gum, Viscarin with Sugar.
2—With high agitation, slowly add gum/sugar blend to cold water until gum is thoroughly hydrated.
3—Add vinegar and mix thoroughly.
4—Add remaining dry ingredients and mix in thoroughly.
5—Store at refrigerated temperatures.
Shake Well before serving.
Serving Size: 30 grams

Example 26

| Chunky Salsa | 33% Less Sodium |
|---|---|
| Water | 5.778% |
| Fresh Onion (White) ⅜" Diced | 13.000% |
| Tomatoes, Crushed | 61.000% |
| Fresh Jalapeno - vein removed; ⅜" diced | 5.600% |
| Green Bell Pepper - ⅜" diced | 5.600% |
| White Vinegar 5% | 5.700% |
| Dehydrated Onions | 0.400% |
| Dehydrated Garlic | 0.200% |
| Salt | 0.980% |
| KCl | 0.871% |
| Trehalose - unmilled | 0.871% |
| | 100.000% |

Preparation and Process:
1—Combine all ingredients in a large stainless steel or enamel pot.
2—Heat mixture to 165 F-175 F and hold for 10 minutes.
3—Hot fill into containers.
4—Store under Refrigeration.

Example 27

| Breakfast Sausage | |
| --- | --- |
| | 33% Less Sodium |
| Pork Blend (60% Pork Trim/40% Pork Fat) | 94.045% |
| Na Cl - Cargill Alberger Flake | 0.965% |
| Ice (shaved) | 2.850% |
| Sugar, White | 0.240% |
| Ground White Pepper 40 Mesh | 0.180% |
| Ground Nutmeg 20 Mesh | 0.040% |
| Ground Ginger | 0.060% |
| Ground Thyme - Spanish 50 mesh | 0.060% |
| Rubbed Sage - Dalmation | 0.120% |
| KCl - Reheis K4763 | 0.720% |
| Trehalose - unmilled | 0.720% |
| | 100.000% |

Process
Chill pork to 30-34 F
Grind through 3/8" plate
Add Ice, salt and seasoning, mix thoroughly.
Re-grind through 3/16" plate
Form into approx. 1 oz. patties (#30 scoop), individually wrap
Refrigerate or Freeze
Preparation:
From refrigerated: Pan fry medium heat approx. 3 minutes on one side, turn and fry additional 2 minutes Example 28

| Italian-Style Tomato Sauce | |
| --- | --- |
| | 33% Reduced Na |
| Water | 24.01% |
| Crushed Tomatoes | 50.00% |
| Tomato Paste | 20.00% |
| Sugar C&H | 2.00% |
| Alberger Fine Flake Salt | 0.70% |
| Olive Oil - Hain | 1.00% |
| Garlic Powder - Atlantic | 0.50% |
| Onion Powder | 0.50% |
| Basil - Whole Leaf McCormick 948239 | 0.30% |
| Black Pepper 34 mesh - McCormick 940013 | 0.03% |
| KCl - Reheis K4763 | 0.48% |
| Trehalose - unmilled, Hayashibara | 0.48% |
| | 100.00% |

Process:
1—In the top of a double boiler, slurry water and tomato paste until thoroughly mixed.
2—Add crushed tomatoes.
3—Add remaining ingredients and mix together thoroughly.
4—Heat mixture to 165 F and hold for 10 minutes.
5—Fill containers.
6—Store refrigerated or frozen.

Example 29

| Turkey Loaf | |
| --- | --- |
| | 30% Reduced Na |
| Water | 14.251% |
| Turkey Meat | 79.060% |
| Actobind | 1.680% |
| Sugar | 0.650% |
| Potassium Phosphate | 0.400% |
| Liquid Pepper | 0.003% |
| Potato Starch | 1.990% |
| Salt | 0.868% |
| KCl - Reheis K4763 | 0.549% |
| Trehalose - unmilled from Cargill | 0.549% |
| | 100.000% |

Process:
Raw turkey breast meat is macerated and 68.67% of the brine is added and tumbled under vacuum for 1.5 hours.
Turkey Trim is ground through 1/8" plate, mixed with remaining 31.33% brine and ground a second time through the 1/8" plate.
The ground turkey mixture is added to the breast meat and all is vacuum mixed for an additional 30 minutes.
Turkey is vacuum stuffed into 130 mm thick plastic casing to RSC of 11".
Product is steam cooked to internal temperature of 162 F.
Product is chilled to 40 degrees within 4 hours and held at 40 F for storage.

What is claimed is:

1. A method, comprising:
   (a) identifying a desired amount of sodium reduction for a reduced sodium food product comprising at least about 10% less sodium chloride than a corresponding control food product, wherein the control food product has a total amount of salt A and a first amount of salt B corresponds to the desired amount of sodium reduction in the reduced sodium food product;
   (b) calculating a second amount of salt X, an amount of potassium chloride Y and an amount of trehalose Z for use in preparing the reduced sodium food product comprising the second amount of salt X, the amount of potassium chloride Y and the amount of trehalose Z in lieu of the first amount of salt B, wherein X is A minus B, Y ranges from about B to about 1.6B, and Z ranges from about 0.8Y to about 1.2Y; and,
   (c) providing an amount of a salt substitute composition consisting of salt in the second amount X, potassium chloride in the amount Y, and trehalose in the amount Z for use in preparing the reduced sodium food product, wherein the reduced sodium food product comprises less than 1.5% trehalose by weight.

2. The method according to claim 1, wherein the reduced sodium food product has from about 20% to about 50% less sodium than the control food product.

3. The method according to claim 1, wherein the reduced sodium food product has from about 25% to about 50% less sodium than the control food product.

4. The method according to claim 1, wherein the reduced sodium food product has from about 25% to about 33 1/3% less sodium than the control food product.

5. A reduced sodium food product, comprising: a salt substitute composition consisting of salt in an amount X, potassium chloride in an amount Y, and trehalose in an amount Z, wherein if a control food product has a total amount of salt A and B represents an amount of salt corresponding to a desired amount of sodium reduction for the control food, X is A minus B, Y ranges from about B to about 1.6B, and Z ranges from about 0.8Y to about 1.2Y, wherein the control food product is substantially similar to the reduced sodium food product except that the control food product comprises salt in an amount A and the reduced sodium food product instead comprises a salt substitute composition consisting of salt in an amount X, potassium chloride in an amount Y and trehalose in an amount Z, and wherein the reduced sodium food product comprises less than 1.5% trehalose by weight.

6. The reduced sodium food product according to claim 5, wherein the reduced sodium food product is chosen from the group consisting of liquid food products, food systems having a liquid component, food systems having topically applied salt, and cheese spreads.

7. The reduced sodium food product according to claim 6, wherein the liquid food products are chosen from the group consisting of soups, gravy, and salad dressings.

8. The reduced sodium food product according to claim 6, wherein the food systems having topically applied salt are chosen from the group consisting of popcorns, potato chips, and french fries.

9. The reduced sodium food product according to claim 6, wherein the reduced sodium food product contains from about 20% to about 50% less sodium than the control food product.

10. The reduced sodium food product according to claim 9, wherein the reduced sodium food product contains from about 25% to about 50% less sodium than the control food product.

11. The reduced sodium food product according to claim 10, wherein the reduced sodium food product contains from about 25% to about 33⅓% less sodium than the control food product.

12. A salt substitute composition, consisting of: salt, potassium chloride, and trehalose in relative amounts X, Y, and Z respectively, wherein the salt substitute composition is adapted for use in preparing a reduced sodium food product containing less salt than a control food product by a percent amount P, and further wherein Z ranges from about 0.8Y to about 1.2Y, and Y ranges from about $(X)(P)/(100-P)$ to $1.6(X)(P)/(100-P)$.

13. The reduced sodium food product according to claim 6, wherein the food systems having a liquid component are chosen from the group consisting of chili, marinated chicken breast, vegetable side dishes, oatmeal, tomato sauce, and salsas.

14. The reduced sodium food product according to claim 6, wherein the cheese spreads are chosen from the group consisting of processed cheddar cheese spread and mozzarella cheese spread.

\* \* \* \* \*

UNITED STATES PATENT AND TRADEMARK OFFICE
CERTIFICATE OF CORRECTION

PATENT NO. : 8,231,925 B2
APPLICATION NO. : 11/670920
DATED : July 31, 2012
INVENTOR(S) : Krishnamurthy Ganesan et al.

It is certified that error appears in the above-identified patent and that said Letters Patent is hereby corrected as shown below:

In column 9, line 27, delete "fill" and insert -- full --, therefor.

In column 21, line 33, after "serve" insert -- . --.

In column 24, line 15, after "NaCl" insert -- . --.

In column 24, line 26, after "0.024%" insert -- . --.

In column 29, line 45, after "fat" insert -- . --.

In column 30, line 24, after "0.008%" insert -- . --.

Signed and Sealed this
Twelfth Day of February, 2013

Teresa Stanek Rea
*Acting Director of the United States Patent and Trademark Office*